(12) United States Patent
Matsumoto et al.

(10) Patent No.: US 10,397,525 B2
(45) Date of Patent: Aug. 27, 2019

(54) MONITORING SYSTEM AND MONITORING METHOD

(71) Applicant: Panasonic Intellectual Property Management Co., Ltd., Osaka (JP)

(72) Inventors: Hiroyuki Matsumoto, Fukuoka (JP); Shintaro Yoshikuni, Fukuoka (JP); Masanari Miyamoto, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 108 days.

(21) Appl. No.: 15/454,722

(22) Filed: Mar. 9, 2017

(65) Prior Publication Data

US 2017/0280108 A1    Sep. 28, 2017

(30) Foreign Application Priority Data

Mar. 24, 2016  (JP) .................................. 2016-060973
Mar. 24, 2016  (JP) .................................. 2016-060974
Mar. 24, 2016  (JP) .................................. 2016-060975

(51) Int. Cl.
*H04N 7/18*        (2006.01)
*H04R 29/00*    (2006.01)
(Continued)

(52) U.S. Cl.
CPC ............. *H04N 7/183* (2013.01); *G01H 9/002* (2013.01); *G01S 5/20* (2013.01); *G06K 9/00771* (2013.01);
(Continued)

(58) Field of Classification Search
CPC .......... B64C 2201/00; B64C 2201/123; B64C 2201/14; B64C 2201/141;
(Continued)

(56) References Cited

U.S. PATENT DOCUMENTS

2006/0122841 A1* 6/2006 Shin ..................... G10H 1/0008
                                                                    704/278
2014/0340513 A1* 11/2014 Nagata ..................... H04N 7/18
                                                                    348/143
2014/0376740 A1    12/2014 Shigenaga et al.

FOREIGN PATENT DOCUMENTS

JP    2006-168421 A    6/2006
JP    2015-029241 A    2/2015

OTHER PUBLICATIONS

Busset et al., "Detection and tracking of drones using advanced acoustic cameras," Optomechatronic MICRO/NANO Devices and Components III: Oct. 8-10, 2007, Proceedings of SPIE vol. 9647, Oct. 13, 2015, 8 pages. (Year: 2015).*

(Continued)

*Primary Examiner* — Pankaj Kumar
*Assistant Examiner* — Alazar Tilahun
(74) *Attorney, Agent, or Firm* — Seed IP Law Group LLP

(57) ABSTRACT

In a pilotless flying object detection system, a masking area setter sets a masking area to be excluded from detection of a pilotless flying object which appears in a captured image of a monitoring area, based on audio collected by a microphone array. An object detector detects the pilotless flying object based on the audio collected by the microphone array and the masking area set by the masking area setter. An output controller superimpose sound source visual information, which indicates the volume of a sound at a sound source position, at the sound source position of the pilotless flying object in the captured image and displays the result on a first monitor in a case where the pilotless flying object is detected in an area other than the masking area.

10 Claims, 23 Drawing Sheets

(51) Int. Cl.
  *G10L 21/10* (2013.01)
  *G01H 9/00* (2006.01)
  *G01S 5/20* (2006.01)
  *G06K 9/00* (2006.01)
  *G08G 5/00* (2006.01)
  *H04R 3/00* (2006.01)
  *H04R 1/40* (2006.01)

(52) U.S. Cl.
  CPC ......... *G08G 5/0026* (2013.01); *G08G 5/0069* (2013.01); *G08G 5/0082* (2013.01); *G10L 21/10* (2013.01); *H04R 3/005* (2013.01); *H04R 29/005* (2013.01); *H04R 1/406* (2013.01); *H04R 2420/07* (2013.01); *H04R 2430/20* (2013.01)

(58) Field of Classification Search
  CPC ........ B64C 2201/146; B64C 2201/027; H04R 1/406; H04R 29/005; H04R 2420/07; H04R 2430/20; H04R 3/005; H04R 1/028; H04R 2499/13; G08G 5/0026; G08G 5/0069; G08G 5/0082; H04N 7/183; H04N 5/23296; H04N 5/23293; H04N 5/272; H04N 5/247; H04N 7/181; G01H 9/002; G06K 9/00771; G06K 9/00664; G10L 21/10; G01S 5/20; G06T 7/74

See application file for complete search history.

(56) References Cited

OTHER PUBLICATIONS

Busset et al., "Detection and tracking of drones using advanced acoustic cameras," Optomechatronic MICRO/NANO Devices and Components III: Oct. 8-10, 2007, Proceedings of SPIE vol. 9647, Oct. 13, 2015, 8 pages.

Notification of Transmittal of the International Search Report and the Written Opinion of the International Searching Authority of the declaration, dated May 29, 2017, for corresponding International Application No. PCT/JP2017/005872, 16 pages.

Kloow, "Acoustic eraser used in the acoustic camera on disturbing sources," BNAM2012, Joint Baltic-Nordic Acoustics Meeting, Jun. 18-20, 2012, 7 pages.

* cited by examiner

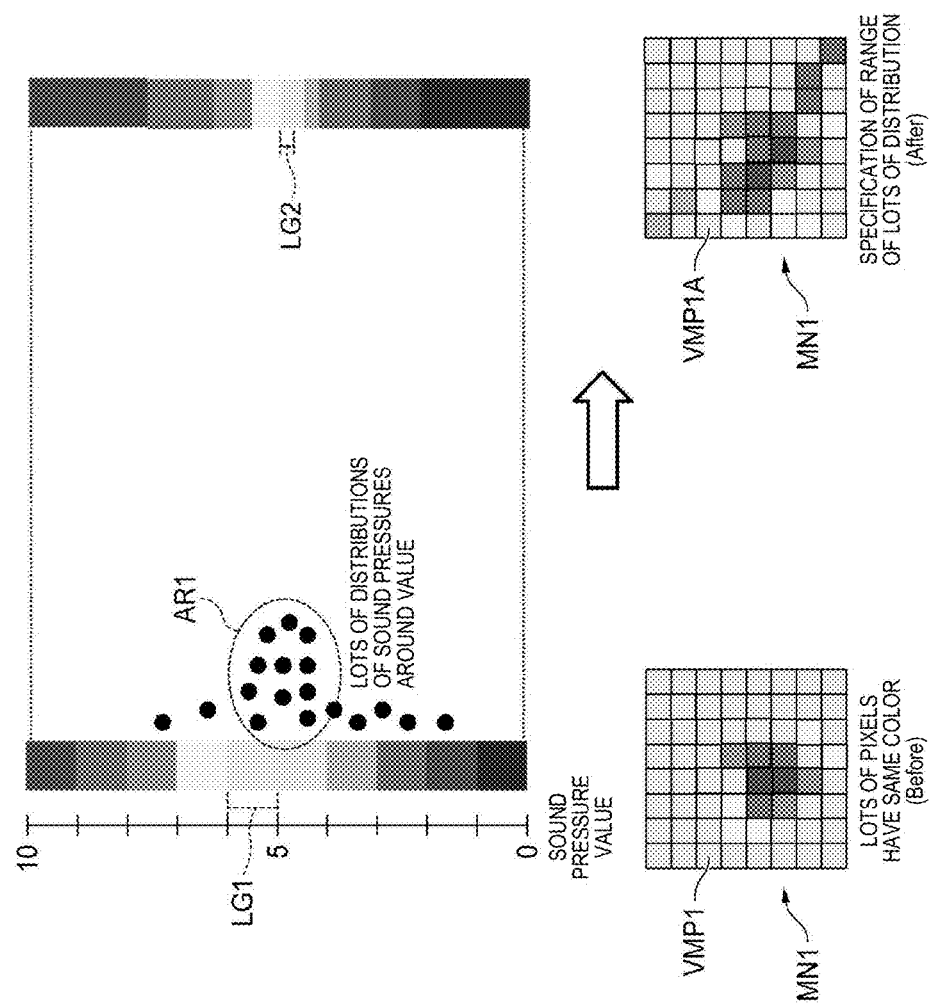

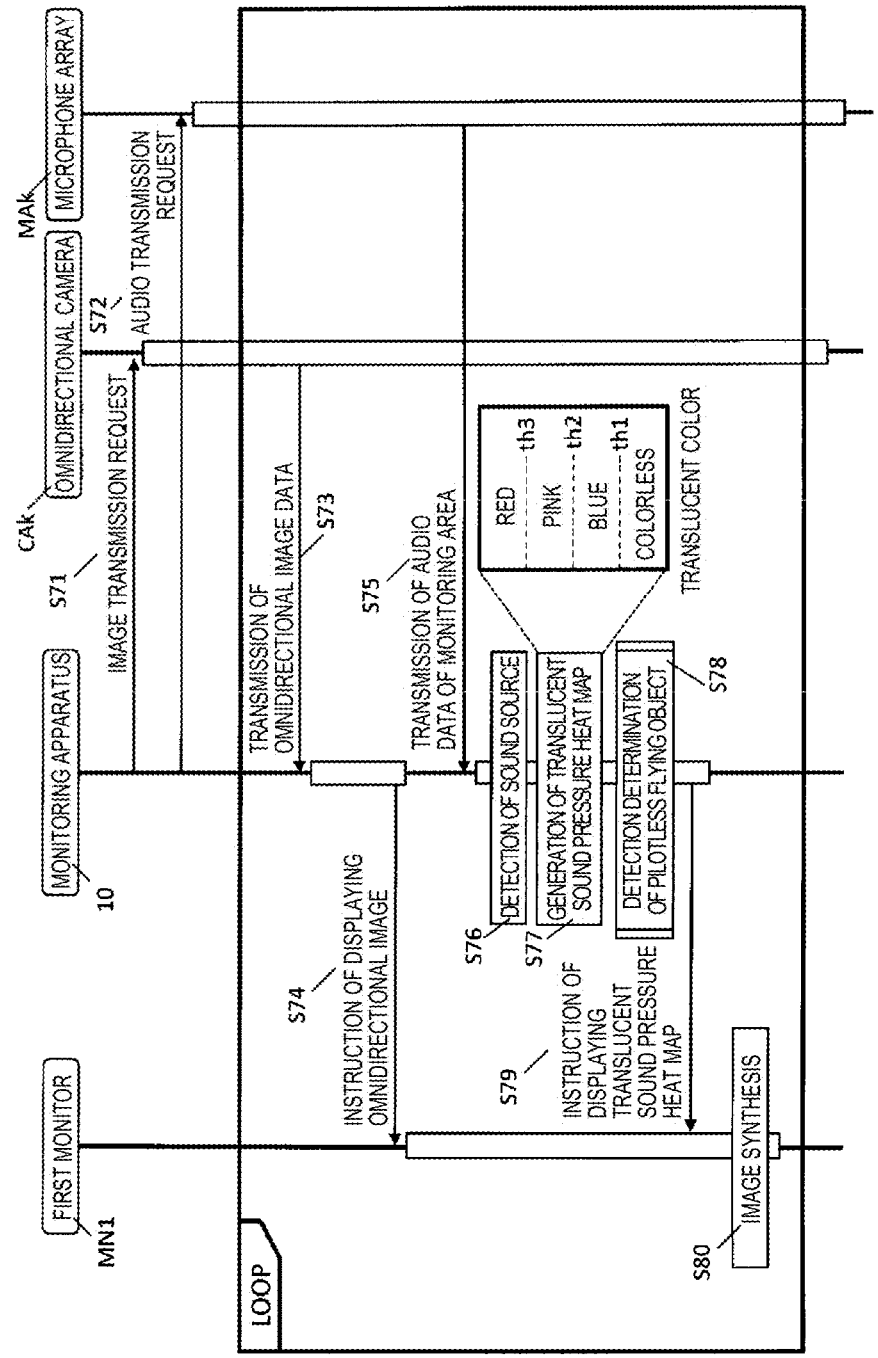

MONITORING SYSTEM AND MONITORING METHOD

BACKGROUND

1. Technical Field

The present disclosure relates to a monitoring system and a monitoring method which monitor an imaging area of a camera device in which, for example, a pilotless flying object flies.

2. Description of the Related Art

A flying object monitoring apparatus depicted in Japanese Patent Unexamined Publication No. 2006-168421 is capable of detecting the presence of an object and the flight direction of the object using a plurality of audio detectors which detect sounds generated in a monitoring area on a per-direction basis. If a processor of the flying object monitoring apparatus detects the flight and the flight direction of a flying object through audio detection using microphones, the processor causes a monitoring camera to face the direction in which the flying object flies. Furthermore, the processor displays a video which is captured by the monitoring camera on a display device.

However, when a pilotless flying object such as a drone is detected, if audio detection is performed by setting all directions in the monitoring area as a monitoring target, from the perspective of a non-directional microphone, a direction in which a frequency of a loud sound being generated is high cannot be set as a masking area. Therefore, in a case where a loud sound is detected in the monitoring area, an object in a direction of the masking area, which is different from a pilotless flying object originally desired to be detected, may be erroneously detected as a target pilotless flying object. In addition, if a masking area that is excluded from being a target is set in advance instead of setting all directions in the monitoring area as a monitoring target, it can be expected that detection of the pilotless flying object originally desired to be detected will be performed faster.

In a monitoring camera which changes an imaging direction in order to perform imaging by focusing on the detected flying object, it is difficult to visually present, to a user, the location in the imaging area of the camera device where the pilotless flying object is detected, and what kinds of sound source are present at which locations in the same imaging area.

In addition, in a case where a sound pressure in a frequency unique to the flying object such as a helicopter or a Cessna is greater than or equal to a predetermined set level, if the flying object is determined to be the monitoring target, when any sound is detected in the imaging area of the camera device, it is difficult to specifically present the volume of the sound as detailed visual information for sound, regardless of the magnitude of the volume of the detected sound at a sound source position.

SUMMARY

The disclosure aims to suppress deterioration of the detection accuracy of a pilotless flying object and to improve a detection process of a pilotless flying object by setting a masking area to be excluded from a detection process of a pilotless flying object as a detection target, in an imaging area of a camera device.

The disclosure aims to visually present, to a user, the location in the imaging area of the camera device where the pilotless flying object is detected, and what kinds of sound source are present at which locations in the same imaging area without deterioration of the visibility of the captured image of the camera device.

The disclosure aims to present in detail, in stages, the volume of the detected sound at the sound source position in the imaging area of the camera device, regardless of the magnitude of the volume of the sound at the sound source position, and to assist the user in accurately ascertaining the volume of the sound at the sound source position.

According to the disclosure, there is provided a monitoring system including a camera which images an imaging area; a microphone array which collects audio of the imaging area; a monitor which displays a captured image of the imaging area which is captured by the camera; a masking area setter that sets a masking area to be excluded from detection of a pilotless flying object which appears in the captured image of the imaging area, based on the audio collected by the microphone array; a detector that detects the pilotless flying object based on the audio collected by the microphone array and the masking area set by the masking area setter; and a signal processor that superimposes a sound source visual image, which indicates the volume of a sound at a sound source position, at the sound source position of the pilotless flying object in the captured image and displays the result on the monitor in a case where the pilotless flying object is detected in an area other than the masking area.

According to the disclosure, there is provided a monitoring method in a monitoring system provided with a camera and a microphone array, the method including: imaging an imaging area by the camera; collecting audio of the imaging area by the microphone array; displaying a captured image of the imaging area which is captured by the camera, on a monitor; setting a masking area to be excluded from detection of a pilotless flying object which appears in the captured image of the imaging area, based on the audio collected by the microphone array; detecting the pilotless flying object based on the audio collected by the microphone array and the set masking area; and superimposing a sound source visual image, which indicates the volume of a sound at a sound source position, at the sound source position of the pilotless flying object in the captured image and displaying the result on the monitor in a case where the pilotless flying object is detected in an area other than the masking area.

According to the disclosure, since the masking area to be excluded from the detection process of the pilotless flying object as the detection target can be set in the imaging area of the camera device, it is possible to suppress deterioration of the detection accuracy of the pilotless flying object and to improve the detection process of the pilotless flying object.

According to the disclosure, there is provided a monitoring method in a monitoring system provided with a camera and a microphone array, the method including: imaging an imaging area by the camera; collecting audio of the imaging area by the microphone array; displaying a captured image of the imaging area which is captured by the camera, on a monitor; deriving a sound parameter, which specifies the volume of a sound of the imaging area, on a per-predetermined-unit basis of pixels which form the captured image of the imaging area, based on the audio collected by the microphone array; generating a sound parameter map as a transparent map in which a sound source visual image, in which the sound parameter is converted into a visual image according to comparison between the derived sound parameter and a threshold relating to the volume of a sound, on a per-predetermined-unit basis of pixels, is linked to correspond to the size of the captured image of the imaging area;

and superimposing the generated translucent map onto the captured image of the imaging area and displaying the result on the monitor.

According to the disclosure, there is provided a monitoring system including a camera which images an imaging area; a microphone array which collects audio of the imaging area; a monitor which displays a captured image of the imaging area which is captured by the camera; a sound parameter deriving unit that derives a sound parameter, which specifies the volume of a sound of the imaging area, on a per-predetermined-unit basis of pixels which form the captured image of the imaging area, based on the audio collected by the microphone array; and a signal processor that generates a sound parameter map as a translucent map in which a sound source visual image, in which the sound parameter is converted into a visual image according to comparison between the sound parameter derived by the sound parameter deriving unit and a threshold relating to the volume of a sound, on a per-predetermined-unit basis of pixels, is linked to correspond to the size of the captured image of the imaging area, in which the signal processor superimposes the translucent map onto the captured image of the imaging area and displays the result on the monitor.

According to the disclosure, it is possible to present in detail, in stages, the volume of the detected sound at the sound source position in the imaging area of the camera device, regardless of the magnitude of the volume of the sound at the sound source position, and to assist the user in accurately ascertaining the volume of the sound at the sound source position.

According to the disclosure, there is provided a monitoring system including a camera which images an imaging area; a microphone array which collects audio of the imaging area; a monitor which displays a captured image of the imaging area which is captured by the camera; a sound parameter deriving unit that derives a sound parameter, which specifies the volume of a sound of the imaging area, on a per-predetermined-unit basis of pixels which form the captured image of the imaging area, based on the audio collected by the microphone array; a threshold adjuster that changes a setting of a correspondence relationship between each threshold of a plurality of thresholds defining the volume of a sound in stages and a sound source visual image in which the sound parameter is converted in stages into a different visual image according to comparison between the sound parameter and each threshold, according to the captured image of the imaging area; and a signal processor that superimposes the sound source visual image corresponding to the sound parameter onto the captured image of the imaging area, on a per-predetermined-unit basis of pixels which form the captured image of the imaging area, based on the sound parameter derived by the sound parameter deriving unit and the correspondence relationship changed by the threshold adjuster and displays the result on the monitor.

According to the disclosure, there is provided a monitoring system including: a camera which images an imaging area; a microphone array which collects audio of the imaging area; a monitor which displays a captured image of the imaging area which is captured by the camera; a sound parameter deriving unit that derives a sound parameter, which specifies the volume of a sound of the imaging area, on a per-predetermined-unit basis of pixels which form the captured image of the imaging area, based on the audio collected by the microphone array; and a signal processor that superimposes a sound source visual image in which the sound parameter is converted in stages into a different visual image according to comparison between the sound parameter derived by the sound parameter deriving unit and a plurality of thresholds relating to the volume of a sound, on a per-predetermined-unit basis of pixels which form the captured image of the imaging area and displays the result on the monitor, in which, when any sound source position is designated in the captured image of the imaging area on which the sound source visual information is superimposed, the sound parameter deriving unit derives the sound parameter for each value obtained by dividing a predetermined unit of pixels which form a rectangular range including the sound source position by a ratio between sizes of the captured image of the imaging area and the rectangular range.

According to the disclosure, there is provided a monitoring method in a monitoring system provided with a camera and a microphone array, the method including: imaging an imaging area by the camera; collecting audio of the imaging area by the microphone array; displaying a captured image of the imaging area which is captured by the camera, on a monitor; deriving a sound parameter, which specifies the volume of a sound of the imaging area, on a per-predetermined-unit basis of pixels which form the captured image of the imaging area, based on the audio collected by the microphone array; changing a setting of a correspondence relationship between each threshold of a plurality of thresholds defining the volume of a sound in stages and a sound source visual image in which the sound parameter is converted in stages into a different visual image according to comparison between the sound parameter and each threshold, according to the captured image of the imaging area; and superimposing the sound source visual image corresponding to the sound parameter onto the captured image of the imaging area, on a per-predetermined-unit basis of pixels which form the captured image of the imaging area, based on the derived sound parameter and the changed correspondence relationship and displaying the result on the monitor.

According to the disclosure, it is possible to present in detail, in stages, the volume of the detected sound at the sound source position in the imaging area of the camera device, regardless of the magnitude of the volume of the sound at the sound source position, and to assist the user in accurately ascertaining the volume of the sound at the sound source position.

BRIEF DESCRIPTION OF THE DRAWINGS

FIG. 18 is an explanatory diagram illustrating an outline of width adjustment of thresholds according to a frequency distribution of sound pressure values, and a display result of a captured image accompanied by the width adjustment in the second exemplary embodiment;

FIG. 24 is a sequence diagram illustrating an example of an operation procedure of the overlay display of the omnidirectional image and the translucent sound pressure heat map in the third exemplary embodiment.

DETAILED DESCRIPTION

Hereinafter, detailed description will be given of an embodiment (hereinafter referred to as the "exemplary embodiment") which specifically discloses a pilotless flying object detection system and a pilotless flying object detection method for detecting a pilotless flying object (for example, drone or radio controlled helicopter) as a monitoring target, as an example of a monitoring system or a monitoring method executed in the monitoring system according to the disclosure, with reference to the diagrams, as appropriate. Description in greater detail than is necessary may be omitted. For example, detailed description of matters which are already well known, and duplicate description of configurations which are effectively the same may be omitted. This is in order to avoid rendering the following description unnecessarily verbose, and to facilitate understanding of a person skilled in the art. The attached diagrams and the following description are provided in order for a person skilled in the art to sufficiently understand the disclosure, and are not intended to limit the scope of the claims.

Hereinafter, a user of a pilotless flying object detection system (for example, a surveillance worker who patrols and guards the monitoring area) is simply referred to as a "user".

Figure 1:
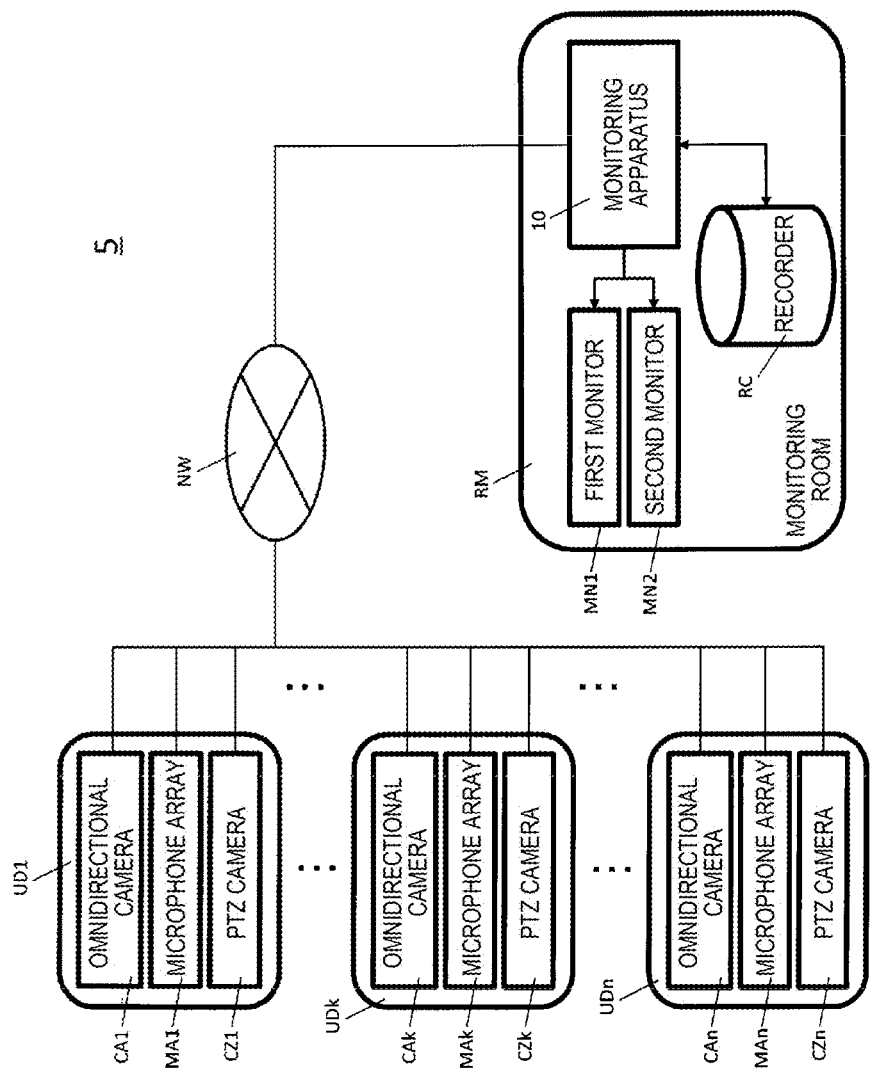
FIG. 1 is a diagram illustrating an example of the schematic configuration of a pilotless flying object detection system of each exemplary embodiment.

FIG. 1 is a diagram illustrating an example of the schematic configuration of pilotless flying object detection system 5 of each exemplary embodiment. Pilotless flying object detection system 5 detects pilotless flying object do (for example, refer to FIG. 14) which is a target of the user as a detection target. Pilotless flying object do is a drone which flies autonomously using a global positioning system (GPS) function for example, a radio controlled helicopter which is wirelessly controlled by a third party, or the like. Pilotless flying object dn is used in aerial photography of a target, delivery of goods, or the like, for example.

In each exemplary embodiment, a multi-copter drone on which a plurality of rotors (in other words, rotary blades) are installed is exemplified as pilotless flying object dn. In a multi-copter drone, generally, in a case in which there are two rotor blades, a high frequency wave of twice the frequency of a specific frequency, and further, a high frequency wave of a multiple frequency thereof are generated. Similarly, in a case in which there are three rotor blades, a high frequency wave of three times the frequency of a specific frequency, and further, a high frequency wave of a multiple frequency thereof are generated. The same applies to a case in which the number of rotor blades is greater than or equal to four.

Pilotless flying object detection system 5 is configured to include a plurality of sound source detection units UD1, . . . , UDk, . . . , and UDn, monitoring apparatus 10, first monitor MN1, second monitor MN2, and recorder RC. The plurality of sound source detection units UD are mutually connected to monitoring apparatus 10 via network NW. k is a natural number of 1 to n. Each sound source detection unit, for example, sound source detection unit UD1 is configured to include microphone array MA1, omnidirectional camera CA1, and PTZ camera CZ1, and other sound source detection units UDk have the same configuration. Except for cases in which it is necessary to particularly distinguish the individual sound source detection units, these will be referred to as sound source detection unit UDk or, simply sound source detection unit UD. Similarly, except for cases in which it is necessary to particularly distinguish the individual microphone arrays, omnidirectional cameras, and PTZ cameras, these will be referred to as microphone array MAk or MA, omnidirectional camera CAk or CA, and PTZ camera CZk or CZ.

In sound source detection unit UDk, microphone array MAk collects sound of all directions in a sound collection area in which the device is installed (for example, the monitoring area as the monitoring target) in a non-directional state. Microphone array MAk includes body 15 (refer to FIG. 2) in the center of which a cylindrical opening of a predetermined width is formed. Examples of sounds which are used as sound collection targets of microphone array MAk include mechanical operating sound of a drone or the like, vocalizations uttered by a human or the like, and a wide variety of other sounds, including not only sounds of an audible frequency (that is, 20 Hz to 23 kHz) domain, but also low frequency sounds which are lower than audible frequencies and ultrasonic sounds which exceed audible frequencies.

Microphone array MAk includes a plurality of non-directional microphones M1 to Mq (refer to FIG. 3). q is a natural number greater than or equal to 2. Microphones M1 to Mq are disposed at a predetermined interval (for example, a uniform interval) in a coaxial circular shape along a circumferential direction around the opening which is provided in body 15. Electret Condenser Microphones (ECM) are used for the microphones, for example. Microphone array MAk transmits the sound data of the sound obtained through collection by microphones M1 to Mq (refer to later description) to monitoring apparatus 10 via network NW. The arrangement of microphones M1 to Mq described above is an example, and other arrangements (for example, arrangements in a square shape, arrangement in a rectangular shape) may be adopted, but it is preferable that microphones M1 to Mq are arranged side by side at equal intervals.

Microphone array MAk includes a plurality of microphones M1 to Mq (for example, q=32), and a plurality of amplifiers PA1 to PAq (refer to FIG. 3) which amplify the output signals of the plurality of microphones M1 to Mq, respectively. The analog signals which are output from each amplifier are converted to corresponding digital signals by A/D converters A1 to Aq which are described later (refer to FIG. 3). The number of microphones in the microphone array MAk is not limited to 32, and may be another number (for example, 16, 64, or 128).

Omnidirectional camera CAk which has approximately the same volume as the opening is housed inside the opening which is formed in the middle of body 15 (refer to FIG. 2) of microphone array MAk. In other words, microphone array MAk and omnidirectional camera CAk are disposed integrally such that body centers thereof are in the same axis direction (refer to FIG. 2). Omnidirectional camera CAk is a camera on which fish-eye lens 45a (refer to FIG. 4), which is capable of capturing an omnidirectional image of the monitoring area as the imaging area of omnidirectional camera CAk which is the sound collection area, is mounted. In each exemplary embodiment, description is given assuming that the sound collection area of microphone array MAk and the imaging area of omnidirectional camera CAk are a shared monitoring area; however, the spatial sizes (for example, volume) of the sound collection area and the imaging area may not be the same. For example, the volume of the sound collection area may be larger or smaller than the volume of the imaging area. In other words, it is sufficient for the sound collection area and the imaging area to have a shared volume portion. Omnidirectional camera CAk functions as a monitoring camera capable of imaging the imaging area in which sound source detection unit UDk is installed, for example. In other words, omnidirectional camera CA has an angle of view of 180° in the vertical direction and 360° in the horizontal direction, and images monitoring area 8 (refer to FIG. 11) which is a hemisphere, for example, as the imaging area.

In each sound source detection unit UDk, omnidirectional camera CAk and microphone array MAk are disposed coaxially due to omnidirectional camera CAk being fitted inside the opening of body 15. In this manner, due to the optical axis of omnidirectional camera CAk and the center axis of the body of microphone array MAk matching, the imaging area and the sound collection area match substantially in the axial circumference direction (that is, the horizontal direction), and it becomes possible to express the position of an object in the image and the position of a sound source of a sound collection target in the same coordinate system (for example, coordinates indicated by (horizontal angle, vertical angle)). Each sound source detection unit UDk is attached such that upward in the vertical direction becomes a sound collection surface and an imaging surface, for example, in order to detect pilotless flying object dn which flies from the sky (refer to FIG. 2).

Monitoring apparatus 10 is configured using a personal computer (PC) or a server, for example. Monitoring apparatus 10 is capable of forming directionality (that is, beam forming) in relation to the sound of all Directions which is collected by microphone array MAk using an arbitrary direction as a main beam direction based on a user operation, and emphasizing the sound of the directivity setting direction.

Monitoring apparatus 10 uses the image (hereinafter, this may be shortened to "captured image") which is captured by omnidirectional camera CAk and processes the captured image to generate an omnidirectional image. The omnidirectional image may be generated by omnidirectional camera CAk instead of monitoring apparatus 10.

Monitoring apparatus 10 superimposes an image (refer to FIG. 15) of the sound pressure heat map based on the calculated value of the sound parameter (for example, sound pressure described below) specifying the volume of the sound which is collected by microphone array MAk, onto the captured image which is captured by omnidirectional camera CAk, and outputs the result to first monitor MN1 to be displayed.

Monitoring apparatus 10 may display a visual image (for example, identification mark) by which it is easy for a user to visually determine detected pilotless flying object dn, on omnidirectional image IMG1, at a position of pilotless flying object dn of first monitor MN1. For example, the visual information means information which is displayed on omnidirectional image IMG1 so as to be clearly distinguished from other objects when the user views omnidirectional image IMG1, and the same is applied to the description below.

First monitor MN1 displays omnidirectional image IMG1 which is captured by omnidirectional camera CAk. Second monitor MN2 displays omnidirectional image IMG2 which is captured by omnidirectional camera CAk. First monitor MN1 generates a composite image obtained by superimposing the identification mark onto omnidirectional image IMG1 and displays the composite image. In FIG. 1, two monitors of first monitor MN1 and second monitor MN2 are connected to monitoring apparatus 10, but only first monitor MN1 may be connected to monitoring apparatus 10. Either first monitor MN1 or second monitor MN2, or both first monitor MN1 and second monitor MN2 may be configured as an integral apparatus with monitoring apparatus 10.

Recorder RC is configured, for example, using a hard disk drive or a semiconductor memory such as a flash memory, and stores data (refer to later description) of various images generated by monitoring apparatus 10, or various data of the omnidirectional image or audio transmitted from each sound source detection unit UDk. Recorder RC may be configured as an integral apparatus with monitoring apparatus 10 or may be omitted from the configuration of pilotless flying object detection system 5.

In FIG. 1, the plurality of sound source detection units UDk and monitoring apparatus 10 have a communication interface, and are interconnected via network NW to be capable of data communication. Network NW may be a wired network (for example, an intranet, the Internet, or a wired local area network (LAN)), and may be a wireless network (for example, a wireless LAN). Sound source detection units UDk and monitoring apparatus 10 may be connected directly without connecting via network NW. All of monitoring apparatus 10, first monitor MN1, second monitor MN2, and recorder RC are installed in monitoring room RM in which a user such as a surveillance worker resides at the time of monitoring.

Figure 2:
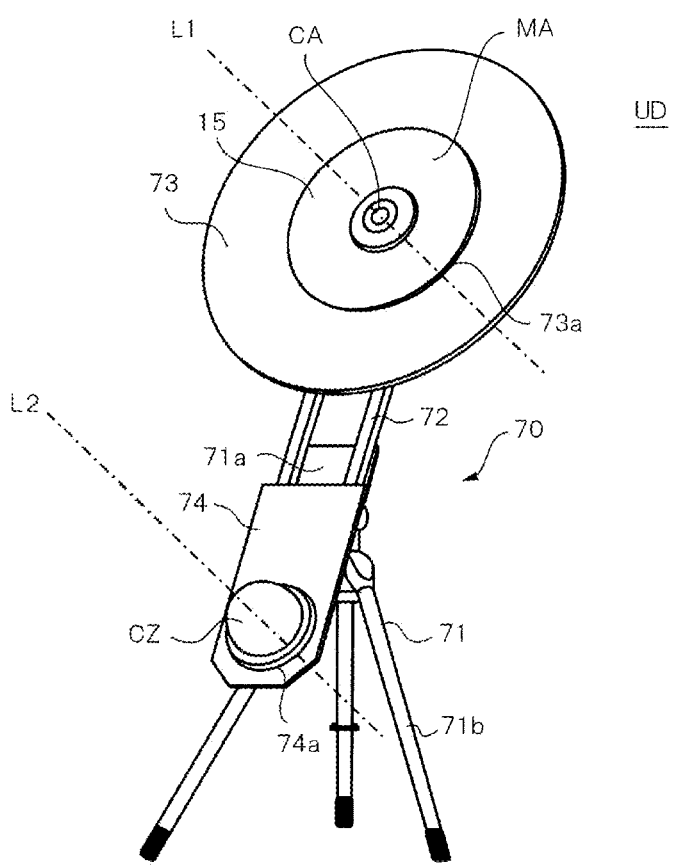
FIG. 2 is a diagram illustrating an example of the external appearance of a sound source detection unit.

FIG. 2 is a diagram illustrating the external appearance of sound source detection unit UD. In addition to microphone array MA, omnidirectional camera CA, and PTZ camera CZ described earlier, sound source detection unit UD includes supporting stand 70 which mechanically supports the earlier-described elements. Supporting stand 70 has a structure combining tripod 71, two rails 72 which are fixed to top board 71a of tripod 71, and first adapter plate 73 and second adapter plate 74 which are attached to the end of each of two rails 72.

First adapter plate 73 and second adapter plate 74 are attached to straddle two rails 72, and have substantially the same planar surfaces. First adapter plate 73 and second adapter plate 74 slide freely on two rails 72, and are fixed adjusted to positions separated from or proximal to each other.

First adapter plate 73 is a disc-shaped plate member. Opening 73a is formed in the center of first adapter plate 73. Body 15 of microphone array MA is housed and fixed in opening 73a. Meanwhile, second adapter plate 74 is a substantially rectangular plate member. Opening 74a is formed in a portion close to the outside of second adapter plate 74. PTZ camera CZ is housed and fixed in opening 74a.

As illustrated in FIG. 2, in the initial installation state, optical axis L1 of omnidirectional camera CA which is housed in body 15 of microphone array MA and optical axis L2 of PTZ camera CZ which is attached to second adapter plate 74 are set to be parallel to each other.

Tripod 71 is supported on a ground surface by three legs 71b, freely moves the position of top board 71a in the vertical direction in relation to the ground surface through manual operation, and is capable of adjusting the orientation of top board 71a in the pan direction and the tilt direction. Accordingly, it is possible to set the sound collection area of microphone array MA (in other words, the imaging area of omnidirectional camera CA or the monitoring area of pilotless flying object detection system 5) to an arbitrary orientation.

Figure 3:
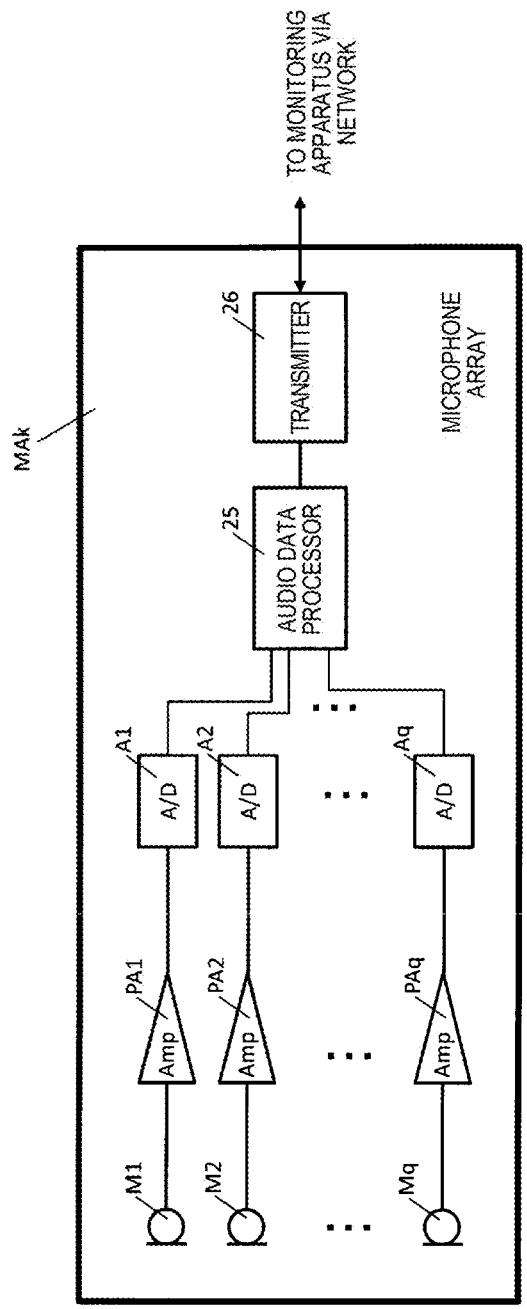
FIG. 3 is a block diagram illustrating an example of the internal configuration of a microphone array, in detail.

FIG. 3 is a block diagram illustrating an example of the internal configuration of microphone array MAk, in detail. Microphone array MAk illustrated in FIG. 3 is configured to include a plurality of microphones M1 to Mq (for example, q=32), a plurality of amplifiers PA1 to PAq, a plurality of A/D converters A1 to Aq, audio data processor 25, and transmitter 26. The plurality of amplifiers PA1 to PAq amplify the corresponding output signals of the plurality of microphones M1 to Mq, and the plurality of A/D converters A1 to Aq convert the analog signals which are output from amplifiers PA1 to PAq into corresponding digital signals.

Audio data processor 25 generates sound data packets based on the digital audio signals which are output from A/D converters A1 to Aq. Transmitter 26 transmits the audio data packets which are generated by audio data processor 25 to monitoring apparatus 10 via network NW.

In this manner, microphone array MAk amplifies the output signals of microphones M1 to Mq using amplifiers PA1 to PAq, and converts the amplified signals into digital audio signals using A/D converters A1 to Aq. Subsequently, microphone array MA generates audio data packets using audio data processor 25, and transmits the audio data packets to monitoring apparatus 10 via network NW.

Figure 4:
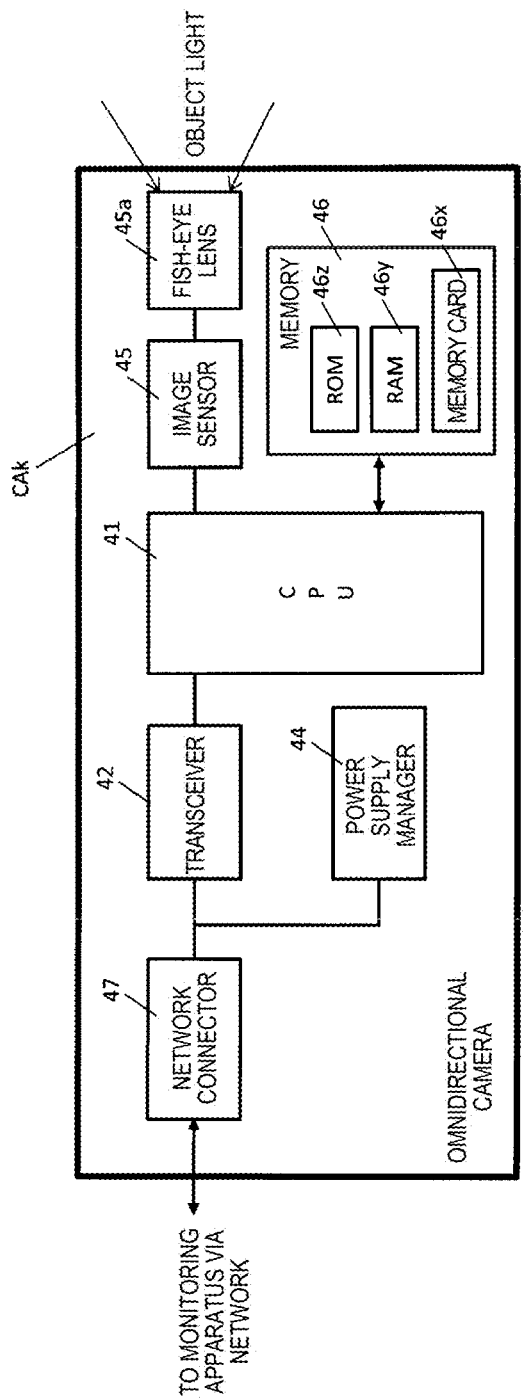
FIG. 4 is a block diagram illustrating an example of the internal configuration of an omnidirectional camera, in detail.

FIG. 4 is a block diagram illustrating an example of the internal configuration of omnidirectional camera CAk, in detail. Omnidirectional camera CAk illustrated in FIG. 4 is configured to include CPU 41, transceiver 42, power supply manager 44, image sensor 45, memory 46, and network connector 47. Fish-eye lens 45a is provided on the front stage (that is, the right side in FIG. 4) of image sensor 45.

CPU 41 performs signal processing for performing overall control of the operations of the elements of omnidirectional camera CAk, input-output processing of data with other elements, computational processing of data, and storage processing of data. Instead of CPU 41, a processor such as a micro processing unit (MPU) or a digital signal processor (DSP) may be provided.

For example, CPU 41 generates cut-out image data which is obtained by cutting out an image of a specific range (direction) within the omnidirectional image data by the designation of a user operating monitoring apparatus 10, and saves the generated image data in memory 46.

Image sensor 45 is configured using a complementary metal-oxide semiconductor (CMOS) sensor or a charge coupled device (CCD) sensor, and acquires omnidirectional image data by subjecting an optical image of an object in an imaging area, which is formed by fish-eye lens 45a to image processing on a light receiving surface.

Memory 46 includes ROM 46z, RAM 46y, and memory card 46x. Programs and setting value data for defining the operations of omnidirectional camera CAk are stored in ROM 46z, RAM 46y stores omnidirectional image data or cut-out image data which is obtained by cutting out a portion range of the omnidirectional image data, and work data, and memory card 46x is connected to omnidirectional camera CAk to be freely inserted and removed, and stores various data.

Transceiver 42 is a network interface (I/F) which controls data communication with network NW to which transceiver 42 is connected via network connector 47.

Power supply manager 44 supplies direct current power to the elements of omnidirectional camera CA. Power supply manager 44 may supply direct current power to devices which are connected to network NW via network connector 47.

Network connector 47 is a connector which transmits omnidirectional image data or two-dimensional panorama image data to monitoring apparatus 10 via network NW, and is capable of supplying power via a network cable.

Figure 5:
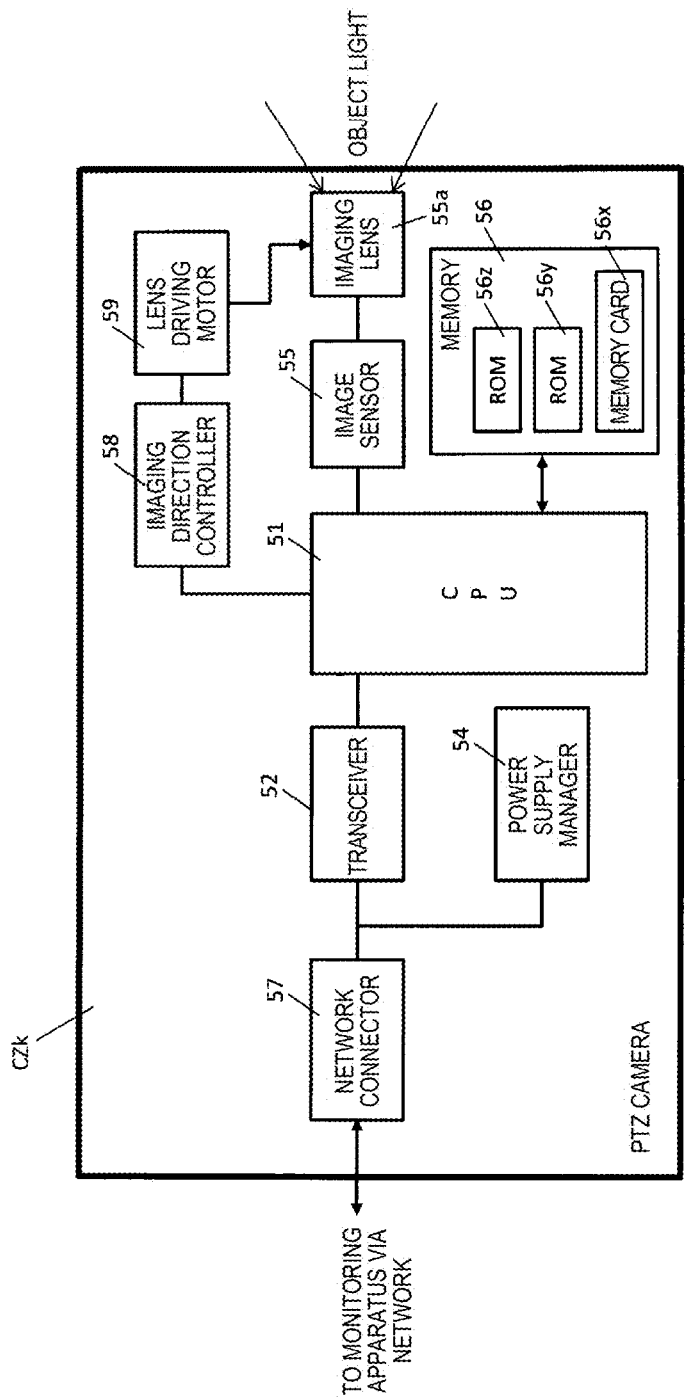
FIG. 5 is a block diagram illustrating an example of the internal configuration of a PTZ camera, in detail.

FIG. 5 is a block diagram illustrating an example of the internal configuration of PTZ camera CZk, in detail. Description of the same elements as in omnidirectional camera CAk will be omitted by assigning reference signs corresponding to the elements in FIG. 4. PTZ camera CZk is a camera capable of adjusting the optical axis direction (also referred to as the imaging direction) through angle of view change instructions from monitoring apparatus 10.

In the same manner as omnidirectional camera CAk, PTZ camera CZk includes CPU 51, transceiver 52, power supply manager 54, image sensor 55, imaging lens 55a, memory 56, and network connector 57, and additionally includes imaging direction controller 58 and lens driving motor 59. If an angle of view change instruction of monitoring apparatus 10 is present, CPU 51 notifies imaging direction controller 58 of the angle of view change instruction.

In accordance with the angle of view change instruction of which imaging direction controller 58 is notified by CPU 51, imaging direction controller 58 controls the imaging direction of PTZ camera CZk in at least one of the pan direction and the tilt direction, and further, as necessary, outputs a control signal for changing the zoom ratio to lens driving motor 59. In accordance with the control signal, lens driving motor 59 drives imaging lens 55a, changes the imaging direction of the imaging lens (the direction of optical axis L2 illustrated in FIG. 2), and adjusts the focal length of imaging lens 55a to change the zoom ratio.

Imaging lens 55a is configured using one lens, or two or more lenses. In imaging lens 55a, the optical axis direction of the pan rotation and the tilt rotation is changed by the driving of lens driving motor 59 according to the control signal from imaging direction controller 58.

Figure 6:
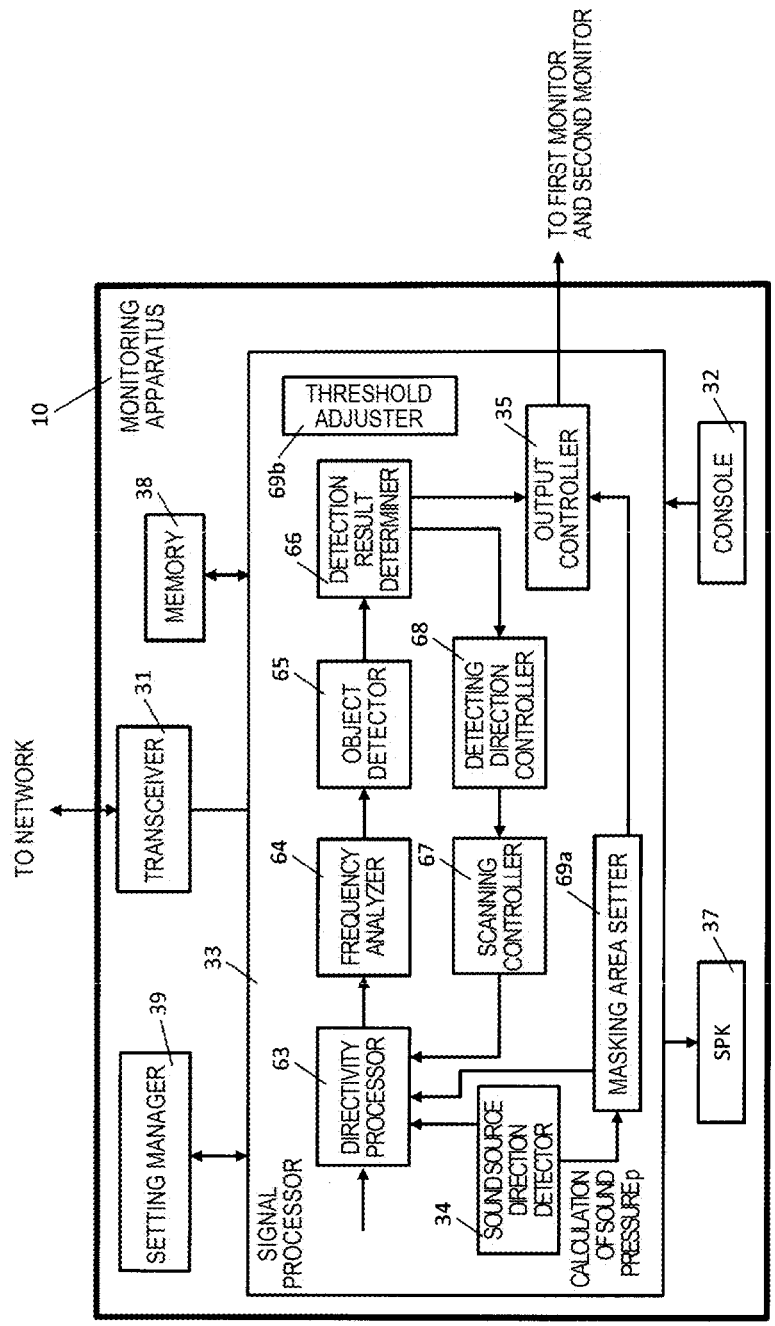
FIG. 6 is a block diagram illustrating an example of the internal configuration of a monitoring apparatus, in detail.

FIG. 6 is a block diagram illustrating an example of the internal configuration of monitoring apparatus 10, in detail. Monitoring apparatus 10 illustrated in FIG. 6 includes at least transceiver 31, console 32, signal processor 33, speaker (SPK) 37, memory 38, and setting manager 39.

Transceiver 31 receives the omnidirectional image data or the cut-out video data which is transmitted by omnidirectional camera CAk, and the audio data which is transmitted by microphone array MAk, and outputs the received data to signal processor 33.

Console 32 is a user interface (UI) for notifying signal processor 33 of the content of an input operation of the user, and is configured by a pointing device such as a mouse and a keyboard. Console 32 may be configured using a touch panel or a touch pad which is disposed corresponding to each screen of first monitor MN1 and second monitor MN2, for example, and with which direct input operation is possible through a finger or a stylus pen of the user.

In a case where in first monitor MN1 and second monitor MN2, red area RD1 of the sound pressure heat map (refer to FIG. 15) which is superimposed to be displayed on the captured image (omnidirectional image IMG1) of any omnidirectional camera CAk is designated by a user, console 32 acquires coordinate data which indicates the designated position, to output the coordinate data to signal processor 33. Signal processor 33 reads the sound data collected by microphone array MAk corresponding to omnidirectional camera CAk from memory 38, forms directionality in the direction toward the sound source position corresponding to the designated position from microphone array MAk, and subsequently outputs the directionality to speaker 37. Accordingly, the user is capable of clearly ascertaining in a state in which the sound at not only pilotless flying object do but also other positions designated on the captured image (omnidirectional image IMG1) by the user is emphasized.

Signal processor 33 is configured using a central processing unit (CPU), a micro processing unit (MPU), or a digital signal processor (DSP), for example, and performs control processing for performing overall control of the operation of the elements of monitoring apparatus 10, input-output processing of data with other elements, computational (calculation) processing of data, and storage processing of data. Signal processor 33 includes directivity processor 63, frequency analyzer 64, object detector 65, detection result determiner 66, scanning controller 67, detecting direction controller 68, masking area setter 69a, threshold adjuster 69b, sound source direction detector 34, and output controller 35. Monitoring apparatus 10 is connected to first monitor MN1 and second monitor MN2.

Sound source direction detector 34 estimates the sound source position using the audio data of the audio of monitoring area 8 which is collected by microphone array MAk according to a well-known cross-power spectrum phase analysis (CSP) method. In the CSP method, when sound source direction detector 34 divides monitoring area 8 illustrated in FIG. 11 into a plurality of blocks and sound is collected by microphone array MA, sound source direction detector 34 is capable of approximately estimating the sound source position in monitoring area 8 by determining whether or not a sound exceeding a threshold sound pressure, sound volume or the like is present on a per-block basis.

In addition, sound source direction detector 34 as the sound parameter deriving unit calculates the sound pressure as the sound parameter, on a per-pixel basis using the individual pixels which form the omnidirectional image data of monitoring area 8 based on the omnidirectional image data which is captured by omnidirectional camera CAk and the audio data which is collected by microphone array MAk. Sound source direction detector 34 outputs a calculated value as the calculation result of the sound pressure, to output controller 35.

Setting manager 39 includes, in advance, a coordinate transformation equation relating to the coordinates of a position designated by the user in relation to the screen of first monitor MN1 on which the omnidirectional image data which is captured by omnidirectional camera CAk is displayed. The coordinate transformation equation is an equation for transforming the coordinates (that is, (horizontal angle, vertical angle)) of a user-designated position in the omnidirectional image data into coordinates of a direction viewed from PTZ camera CZ based on a difference in the physical distance between the installation position of omnidirectional camera CAk (refer to FIG. 2) and the installation position of PTZ camera CZk (refer to FIG. 2).

Signal processor 33 uses the coordinate transformation equation held by setting manager 39 to calculate the coordinates (θMAh, θMAv) indicating the directivity setting direction facing the actual sound source position corresponding to the position designated by the user from the installation position of PTZ camera CZk, using the installation position of PTZ camera CZk (refer to FIG. 2) as a reference. θMAh is the horizontal angle of a direction facing the actual sound source position corresponding to the position designated by the user, from the perspective of the installation position of PTZ camera CZk. θMAv is the vertical angle of a direction facing the actual sound source position corresponding to the position designated by the user, from the perspective of the installation position of PTZ camera CZk. As illustrated in FIG. 2, the distance between omnidirectional camera CAk and PTZ camera CZk is known, and since optical axes L1 and L2 are parallel to each other, it is possible to realize the calculation process of the coordinate transformation equation using a well-known geometric computation, for example. The sound source position is the actual sound source position corresponding to the position designated from console 32 by an operation of a finger or a stylus pen of the user in relation to the video data which is displayed on first monitor MN1 and second monitor MN2.

As illustrated in FIG. 2, omnidirectional camera CAk and microphone array MAk are both disposed coaxially with the optical axis direction of omnidirectional camera CAk and the center axis of the body of microphone array MAk in the exemplary embodiment. Therefore, the coordinates of the designated position derived by omnidirectional camera CAk according to the designation of the user in relation to first monitor MN1 on which the omnidirectional image data is displayed may be treated as the same as the emphasized direction (also referred to as the directivity setting direction) of the sound from the perspective of microphone array MAk. In other words, when user designation in relation to first monitor MN1 (or second monitor MN2 is possible) on which the omnidirectional image data is displayed is present, monitoring apparatus 10 transmits the coordinates of the designated position in the omnidirectional image data to omnidirectional camera CAk. Accordingly, omnidirectional camera CAk calculates the coordinates (horizontal angle, vertical angle) indicating the direction of the sound source position corresponding to the designated position from the perspective of omnidirectional camera CAk using the coordinates of the designated position which are transmitted from monitoring apparatus 10. Omnidirectional camera CAk transmits the calculation results of the coordinates indicating the direction of the sound source position to monitoring apparatus 10. Monitoring apparatus 10 is capable of using the coordinates (horizontal angle, vertical angle) which are calculated by omnidirectional camera CAk as the coordinates (horizontal angle, vertical angle) indicating the direction of the sound source position from the perspective of microphone array MAk.

However, in a case in which omnidirectional camera CAk and microphone array MAk are not disposed coaxially, it is necessary for setting manager 39 to follow the method described in Japanese Patent Unexamined Publication No. 2015-029241 to transform the coordinates derived by omnidirectional camera CAk into the coordinates of the direction from the perspective of microphone array MAk.

Setting manager 39 holds first threshold th1, second threshold th2, and third threshold th3 (for example, refer FIG. 9) which are compared to sound pressure p on a per-pixel basis using the pixels which form the omnidirectional image data or two-dimensional panorama image data calculated by sound source direction detector 34. Here, sound pressure p is used as an example of a sound parameter relating to the sound source, represents the magnitude of the sound which is collected by microphone array MA, and is differentiated from the sound volume which represents the magnitude of the sound which is output from speaker 37. First threshold th1, second threshold th2, and third threshold th3 are values which are compared to the sound pressure of the sound which is generated in monitoring area 8, and are set to predetermined values for determining the sound emitted by pilotless flying object dn, for example. It is possible to set a plurality of thresholds other than first threshold th1, second threshold th2, and third threshold th3, and here, in order for simple description, first threshold th1, second threshold th2 which is a larger value than first threshold th1, third threshold th3 which is a larger value than those two thresholds are set, totaling three thresholds (first threshold th1<second threshold th2<third threshold th3).

As described later, in the sound pressure heat map generated by output controller 35, red area RD1 (refer to FIG. 15) of the pixels at which a greater sound pressure than third threshold th3 is obtained is rendered in red, for example, on first monitor MN1 on which the omnidirectional image data is displayed. Pink area PD1 of the pixels at which a sound pressure which is greater than second threshold th2 and less than or equal to third threshold th3 is obtained is rendered in pink, for example, on first monitor MN1 on which the omnidirectional image data is displayed. Blue area BD1 of the pixels at which a sound pressure which is greater than first threshold th1 and less than or equal to second threshold th2 is obtained is rendered in blue, for example, on first monitor MN1 on which the omnidirectional image data is displayed. Area N1 of the pixels having a sound pressure less than or equal to first threshold th1 is rendered colorless, for example, on first monitor MN1 on which the omnidirectional image data is displayed, that is, is no different from the display color of the omnidirectional image data.

Speaker 37 outputs the audio data collected by microphone array MAk, or the audio data which is collected by microphone array MAk and for which directionality is formed by signal processor 33. Speaker 37 may be configured as a separate device from monitoring apparatus 10.

Memory 38 is configured using a ROM or a RAM. Memory 38 holds various data including sound data of a fixed zone, setting information, programs, and the like, for example. Memory 38 includes pattern memory in which sound patterns which are characteristic to the individual pilotless flying objects do are registered. Furthermore, memory 38 stores data of the sound pressure heat map generated by output controller 35. An identification mark which schematically represents the position of pilotless flying object dn is registered in memory 38. The identification mark which is used here is a star-shaped symbol as an example. The identification mark is not limited to a star shape, and in addition to a circle shape or a rectangle shape, may further be a symbol or character such as a fylfot which is reminiscent of a pilotless flying object. The display form of the identification mark may be changed between day and night, for example, a star shape during the day, and a rectangular shape during the night so as not to be confused for a star. The identification mark may be dynamically changed. For example, a star-shaped symbol may be displayed in a blinking manner, or may be rotated, further engaging the attention of the user.

Figure 7:
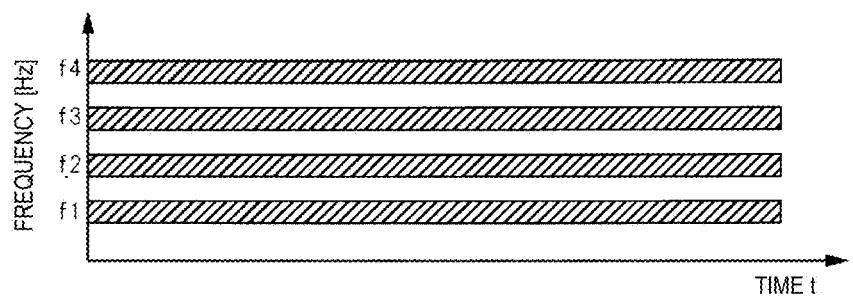
FIG. 7 is a timing chart illustrating an example of a detected sound signal pattern of a pilotless flying object which is registered in a memory.

FIG. 7 is a timing chart illustrating an example of a detected sound pattern of pilotless flying object dn which is registered in memory 38. The detected sound pattern illustrated in FIG. 7 is a combination of frequency patterns, and includes sounds of four frequencies f1, f2, f3, and f4 which are generated by the rotation of four rotors which are installed on the multi-copter pilotless flying object dn, or the like. The signals of the frequencies are signals of frequencies of different sounds which are generated in accordance with the rotation of a plurality of blades which are axially supported on each rotor, for example.

In FIG. 7, the frequency areas shaded with diagonal lines are areas with high sound pressure. The detected sound pattern may include not only the number of sounds and the sound pressure of the plurality of frequencies, but also other sound information. For example, a sound pressure rate representing the sound pressure ratio of the frequencies or the like is exemplified. Here, for example, the detection of pilotless flying object dn is determined according to whether or not the sound pressure of each frequency contained in the detected sound pattern exceeds a threshold.

Directivity processor 63 uses the sound signals (also referred to as sound data) which are collected by the non-directional microphones M1 to Mq, performs a directionality forming process described earlier (beam forming), and performs an extraction process of the sound data in which directions of other areas except for the masking area set by masking area setter 69*a* are used as the directivity setting direction. Directivity processor 63 is also capable of performing an extraction process of the sound data in which a direction range of other areas except for the masking area set by masking area setter 69*a* is used as a directivity setting area. Here, the directivity setting area is a range including a plurality of adjacent directivity setting directions, and in comparison to the directivity setting direction, is intended to include a degree of spreading in the directivity setting direction.

Frequency analyzer 64 performs frequency analysis processing on the sound data which is subjected to the extraction process in the directivity setting direction by directivity processor 63. In the frequency analysis processing, the frequency and the sound pressure thereof included in the sound data of the directivity setting direction are detected.

Figure 8:
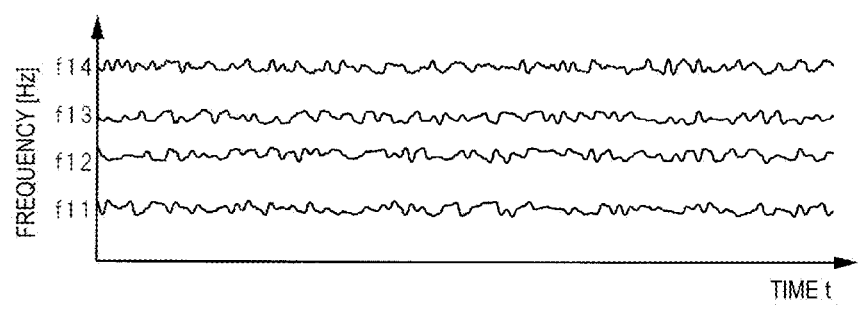
FIG. 8 is a timing chart illustrating an example of frequency variation in the detected sound signals which is obtained as a result of frequency analysis processing.

FIG. 8 is a timing chart illustrating an example of frequency variation in the detected sound signals which is obtained as a result of the frequency analysis processing. In FIG. 8, four frequencies f11, f12, f13, and f14, and the sound pressure of each frequency are obtained as the detected sound signals (that is, the detected sound data). In FIG. 8, the fluctuation in each frequency which changes irregularly occurs due to fluctuations in the rotation of the rotors (the rotary blades) which change slightly when pilotless flying object dn controls the posture of the body of pilotless flying object dn.

Object detector 65 as a detector performs a detection process of pilotless flying object dn by using the result of the frequency analysis processing of frequency analyzer 64. Specifically, in the detection process of pilotless flying object dn, object detector 65 compares the detected sound pattern which is obtained as a result of the frequency analysis processing (refer to FIG. 8) (frequencies f11 to f14), to the detected sound pattern which is registered in advance in the pattern memory of memory 38 (refer to FIG. 7) (frequencies f1 to f4) in other areas except for the masking area set by masking area setter 69*a*. Object detector 65 determines whether or not both of the patterns of detected sounds are similar.

Whether or not both of the patterns of detected sounds are similar is determined as follows, for example. In a case in which the sound pressures of at least two frequencies contained in the detected sound data of four frequencies f1, f2, f3, and f4 exceed a threshold, object detector 65 determines the sound patterns to be similar and detects pilotless flying object dn. Pilotless flying object dn may be detected in a case in which other conditions are satisfied.

In a case in which detection result determiner 66 determines that pilotless flying object dn is not present, detection result determiner 66 instructs detecting direction controller 68 to transition to detecting pilotless flying object dn in the next directivity setting direction. In a case in which detection result determiner 66 determines that pilotless flying object dn is present as a result of the scanning of the directivity setting direction, detection result determiner 66 notifies output controller 35 of the detection results of pilotless flying object dn. Information of the detected pilotless flying object dn is included in the detection results. The information of pilotless flying object dn includes identification information of pilotless flying object dn, and positional information (for example, direction information) of pilotless flying object dn in the sound collection area.

Detecting direction controller 68 controls the direction for detecting pilotless flying object dn in the sound collection area based on the instructions from detection result determiner 66. For example, detecting direction controller 68 sets an arbitrary direction of directivity setting area BF1 which contains the sound source position which is estimated by sound source direction detector 34 in the entirety of the sound collection area as the detection direction.

Scanning controller 67 instructs directivity processor 63 to perform beam forming using the detection direction which is set by detecting direction controller 68 as the directivity setting direction.

Directivity processor 63 performs beam forming on the directivity setting direction which is instructed from scanning controller 67. In the initial settings, directivity processor 63 uses the initial position in directivity setting area BF1 (refer to FIG. 11) which includes the sound source position which is estimated by sound source direction detector 34 as directivity setting direction BF2. Directivity setting direction BF2 is set successively from within directivity setting area BF1 by detecting direction controller 68.

Masking area setter 69*a* sets the masking area to be excluded from the detection of pilotless flying object dn, which appears in the omnidirectional image or the two-dimensional panorama image (that is, the captured image) based on the omnidirectional image data or the two-dimensional panorama image data of monitoring area 8 captured by omnidirectional camera CAk, and the audio data of monitoring area 8 collected by microphone array MAk. The setting of the masking area will be described later in detail with reference to FIGS. 13 and 14.

Output controller 35 controls the operations of first monitor MN1, second monitor MN2, and speaker 37, outputs the omnidirectional image data or the two-dimensional panorama image data which is transmitted from omnidirectional camera CAk to first monitor MN1 and second monitor MN2 to be displayed, and further outputs the audio data which is transmitted from microphone array MAk to speaker 37. In a case in which pilotless flying object do is detected, output controller 35 outputs the identification mark which represents pilotless flying object do to first monitor MN1 (or second monitor MN2 is possible) in order to superimpose the identification mark onto omnidirectional image and display the result.

Output controller 35 subjects the sound data of the directivity setting direction to emphasis processing by using the audio data which is collected by microphone array MAk and the coordinates which indicate the direction of the sound source position which is derived by omnidirectional camera CAk to perform a directionality forming process on the sound data which is collected by microphone array MAk.

Output controller 35 generates a sound pressure heat map in which a calculated value of the sound pressure is allocated to the position of a pixel on a per-pixel basis using the individual pixels which form the omnidirectional image data or two-dimensional panorama image data, by using the sound pressure values on a per-pixel basis using the pixels which form the omnidirectional image data or two-dimensional panorama image data which are calculated by sound source direction detector 34. Furthermore, output controller 35 generates the sound pressure heat map such as that illustrated in FIG. 15 by performing a color transformation process on the sound pressure values on a per-pixel basis using the pixels of the generated sound pressure heat map such that it is easy for a user to perform visual determination.

Output controller 35 is described as generating a sound pressure heat map in which sound pressure values which are calculated in pixel units are allocated to corresponding pixel positions; however, the sound pressure heat map may be generated by calculating the average value of the sound pressure values in pixel block units formed of a predetermined number of (for example, 2×2, 4×4) pixels without calculating the sound pressure on a per-pixel basis, and allocating the average value of the sound pressure values corresponding to the corresponding predetermined number of pixels.

The details of threshold adjuster 69b will be described in a second exemplary embodiment described below, and thus the detailed description thereof is omitted here.

Next, the operation of pilotless flying object detection system 5 in the exemplary embodiment will be described in detail.

Figure 9:
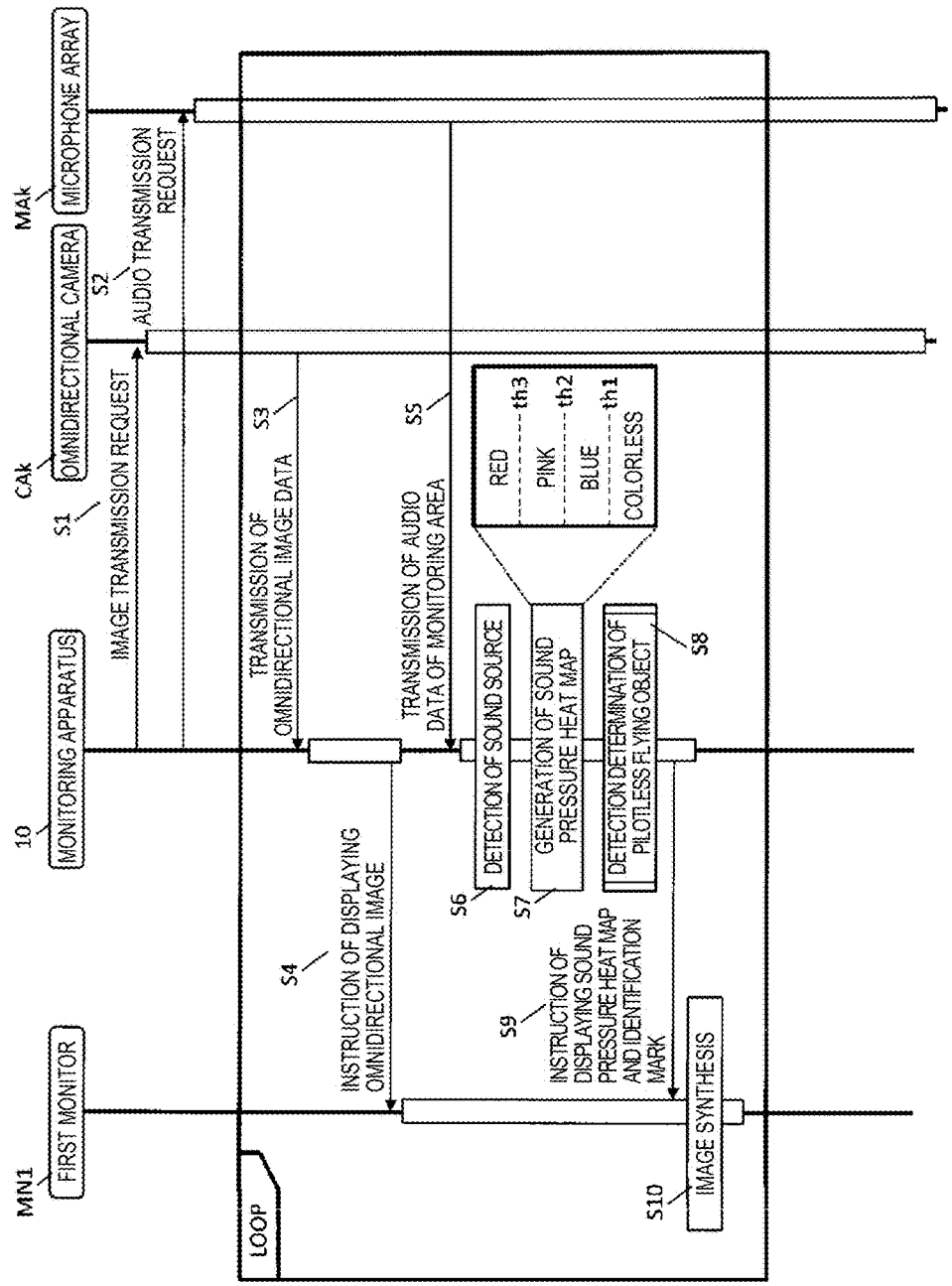
FIG. 9 is a sequence diagram illustrating an example of an operation procedure of detecting a pilotless flying object and displaying a detection result thereof in a first exemplary embodiment.

FIG. 9 is a sequence diagram illustrating an example of an operation of displaying a detection result of pilotless flying object dn in pilotless flying object detection system 5 of the first exemplary embodiment. When power is input to the devices (for example, first monitor MN1, monitoring apparatus 10, omnidirectional camera CAk, and microphone array MAk) of pilotless flying object detection system 5, pilotless flying object detection system 5 starts operating. In the description of FIG. 9, it is assumed that the masking area to be excluded from the detection of pilotless flying object dn is already set, and information indicating the masking area is registered in memory 38.

In the initialization operations, monitoring apparatus 10 performs an image transmission request in relation to omnidirectional camera CAk (S1). Omnidirectional camera CAk starts the imaging process corresponding to the input of power in accordance with the request. Furthermore, monitoring apparatus 10 performs a sound transmission request in relation to microphone array MAk (S2). Microphone array MAk starts the sound collection process corresponding to the input of power in accordance with the request.

Once the initialization operations are completed, omnidirectional camera CAk transmits the data of the captured image (for example, a still image or a video) which is obtained through imaging to monitoring apparatus 10 via network NW (S3). In order for the brief description, in FIG. 9, it is described that the omnidirectional image data is transmitted from omnidirectional camera CAk; however, two-dimensional panorama image data may be transmitted, and the same is applied to FIG. 14. Monitoring apparatus 10 converts the captured image data which is transmitted from omnidirectional camera CAk into display data such as NTSC, outputs the display data to first monitor MN1, and instructs first monitor MN1 to display the omnidirectional image data (S4). When the display data transmitted from monitoring apparatus 10 is input, first monitor MN1 displays on the screen, the data (refer to FIGS. 12 and 15) of omnidirectional image IMG1 by omnidirectional camera CAk.

Microphone array MAk encodes the sound data of the sound obtained through collection and transmits the encoded sound data to monitoring apparatus 10 via network NW (S5). In monitoring apparatus 10, sound source direction detector 34 calculates the sound pressure as the sound parameter, on a per-pixel basis using the individual pixels which form the omnidirectional image data of monitoring area 8 based on the omnidirectional image data which is captured by omnidirectional camera CAk and the audio data which is collected by microphone array MAk, and further estimates the sound source position within monitoring area 8 (S6). When monitoring apparatus 10 detects pilotless flying object dn, the estimated sound source position is used as the reference position of directivity setting area BF1 which is necessary for the initial setting of the directivity setting direction.

In addition, in monitoring apparatus 10, output controller 35 generates a sound pressure map in which a calculated value of the sound pressure is allocated to the position of a pixel on a per-pixel basis using the pixels which form the omnidirectional image data, by using the sound pressure values on a per-pixel basis using the pixels which form the omnidirectional image data which are calculated by sound source direction detector 34. Furthermore, output controller 35 generates a sound pressure heat map such as that illustrated in FIG. 15 by performing a color transformation process on the sound pressure values on a per-pixel basis using the pixels of the generated sound pressure map so as to obtain the visual image (for example, colored image) such that it is easy for the user to perform visual determination (S7).

Further, when signal processor 33 forms sequential directionality for the area other than the masking area set by masking area setter 69a, by using the audio data transmitted from microphone array MAk in step S5, monitoring apparatus 10 performs detection determination of pilotless flying object dn for each directivity setting direction in which the directionality is formed (S8). The detection determination process of pilotless flying object dn will be described later in detail with reference to FIGS. 10 and 11.

In a case in which pilotless flying object dn is detected as a result of the detection determination process, output controller 35 in monitoring apparatus 10 superimposes the sound pressure heat map generated in step S7, and the identification mark, which represents pilotless flying object dn which is present in the directivity setting direction detected in step S8, onto omnidirectional image IMG1 which is displayed on the screen of first monitor MN1 and displays the result (S9).

First monitor MN1 combines (superimposes) the sound pressure heat map on omnidirectional image IMG1 according to the instruction from monitoring apparatus 10 and displays the result, and combines (superimposes) the identification mark representing pilotless flying object dn on omnidirectional image IMG1 and displays the result (S10). Subsequently, the process of pilotless flying object detection system 5 returns to step S3, and processes of steps S3 to S10 are repeated until a predetermined event such as the power being operated to turn off, for example, is detected.

Figure 10:
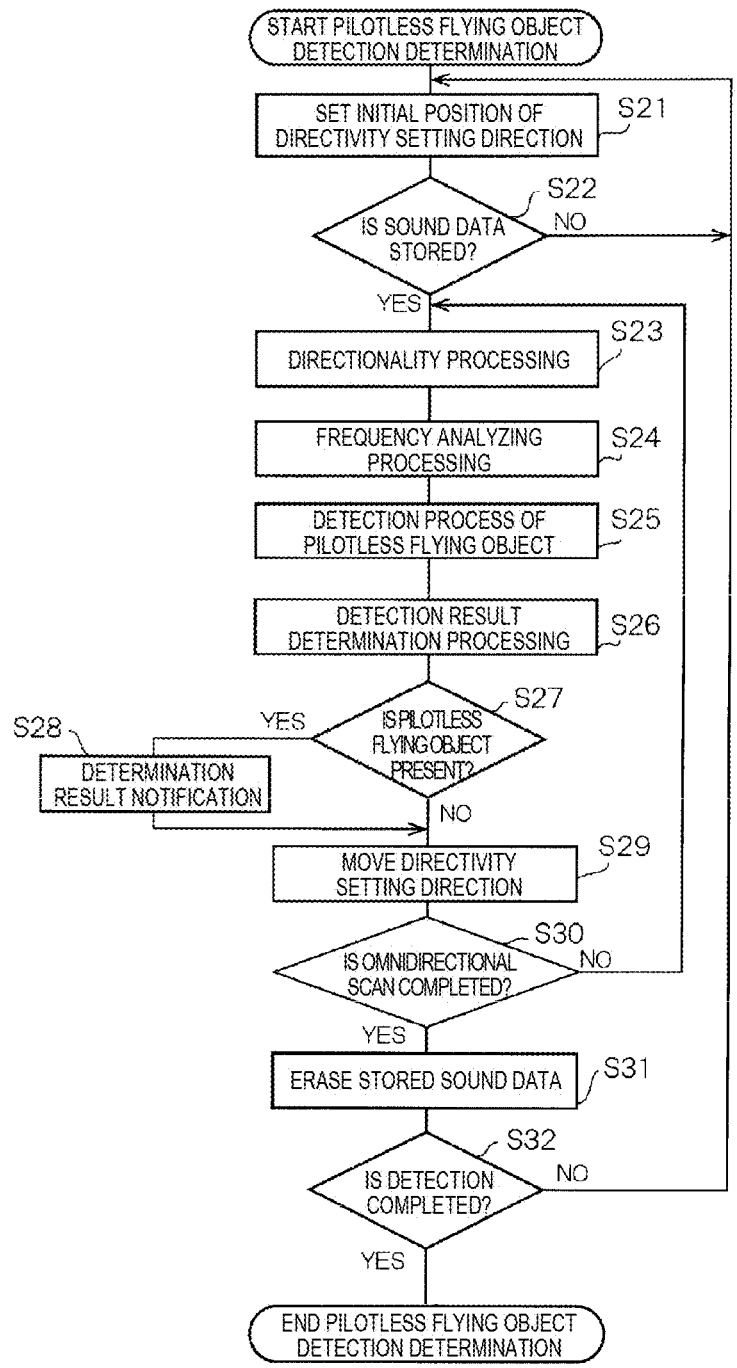
FIG. 10 is a flowchart illustrating a detailed example of an operation procedure of a pilotless flying object detection determination of step S8 of FIG. 9.

FIG. 10 is a flowchart illustrating a detailed example of a pilotless flying object detection determination procedure of step S8 of FIG. 9. In sound source detection unit UDk, directivity processor 63 sets directivity setting area BF1 which is other than the masking area and is based on the sound source position estimated by sound source direction detector 34, as the initial position of directivity setting direction BF2 by using information of the masking area set by masking area setter 69a (S21). The information of the masking area is coordinates in a direction toward the masking area seen from microphone array MAk.

Figure 11:
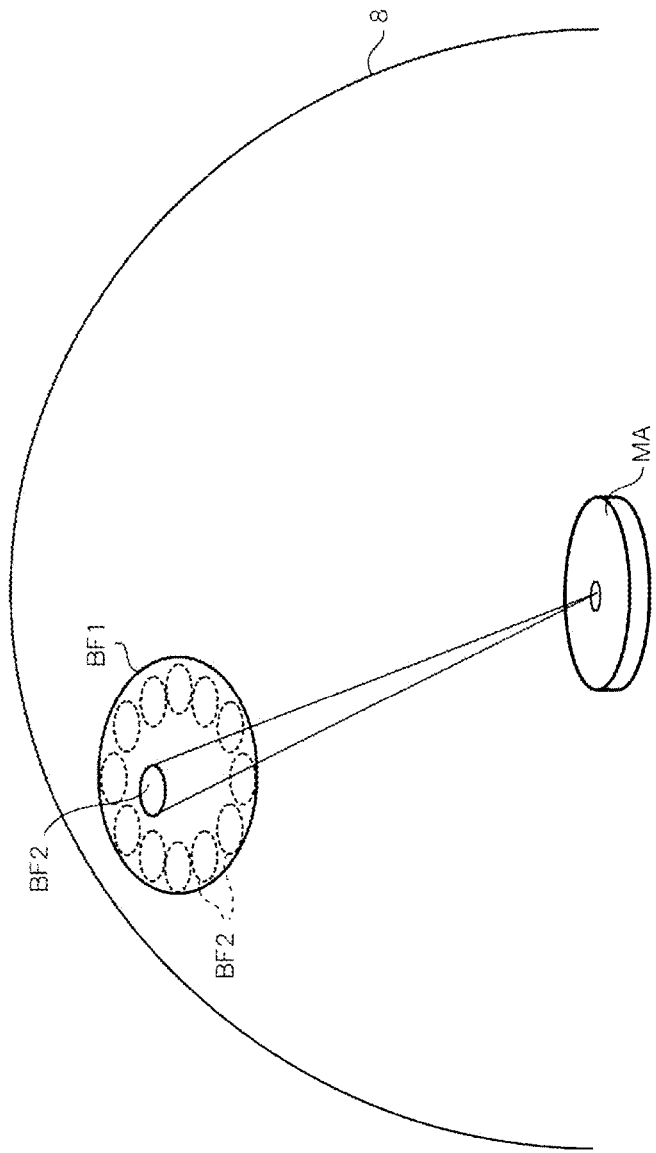
FIG. 11 is a diagram illustrating an example of a situation in which directivity setting directions in a monitoring area are sequentially scanned, and a pilotless flying object is detected.

FIG. 11 is a diagram illustrating an example of a situation in which directivity setting directions BF2 in monitoring area 8 are sequentially scanned, and pilotless flying object do is detected. The initial position is preferably other than the masking area set by masking area setter 69a and may not be limited to directivity setting area BF1 based on the sound source position of monitoring area 8 which is estimated by sound source direction detector 34. That is, an arbitrary position designated by the user may be set as the initial position as long as the position is other than the masking area set by masking area setter 69a, and the inside of monitoring area 8 may be sequentially scanned. Due to the initial position not being limited, even in a case in which the sound source included in directivity setting area BF1 based on the estimated sound source position is not a pilotless flying object, it becomes possible to quickly detect a pilotless flying object flying in another directivity setting direction.

Directivity processor 63 determines whether or not the audio data which is collected by microphone array MAk and converted to digital values by A/D converters An1 to Aq is stored temporarily in memory 38 (S22). In a case in which the sound data is not stored (NO in S22), the process of directivity processor 63 returns to step S21.

When the sound data which is collected by microphone array MA is temporarily stored in memory 38 (YES in S22), directivity processor 63 performs beam forming on an arbitrary directivity setting direction BF2 in directivity setting area BF1 of monitoring area 8, which is other than the masking area set by masking area setter 69a, and performs an extraction process on the sound data of directivity setting direction BF2 (S23).

Frequency analyzer 64 detects the frequency and sound pressure of the sound data which is subjected to the extraction process (S24).

Object detector 65 compares the detected sound pattern which is registered in the pattern memory of memory 38 with the detected sound pattern which is obtained as a result of the frequency analysis processing and performs detection of pilotless flying object (S25).

Detection result determiner 66 notifies output controller 35 of the comparison results, and notifies detecting direction controller 68 of the detection direction transition (S26).

For example, object detector 65 compares the detected sound pattern which is obtained as a result of the frequency analysis processing to four frequencies f1, f2, f3, and f4 which are registered in the pattern memory of memory 38. As a result of the comparison, in a case in which the both detected sound patterns include at least two of the same frequency and the sound pressures of the frequencies are greater than first threshold th1, object detector 65 determines that the patterns of both detected sounds are similar and that pilotless flying object do is present.

Here, a case is assumed in which at least two frequencies match; however, object detector 65 may determine similarity in a case in which a single frequency matches and the sound pressure of the frequency is greater than first threshold th1.

Object detector 65 may set an allowed frequency error in relation to each frequency, and may determine whether or not there is similarity by treating frequencies within the frequency error range as the same frequency.

In addition to the comparison of frequencies and sound pressures, object detector 65 may perform determination by adding substantial matching of sound pressure ratios of the sounds of the frequencies to the determination conditions. In this case, since the determination conditions become stricter, it becomes easier for sound source detection unit UDk to identify a detected pilotless flying object dn as the target (pilotless flying object dn) which is registered in advance, and it is possible to improve the detection precision of pilotless flying object dn.

Detection result determiner 66 determines whether or not pilotless flying object dn is present as a result of step S26 (S27).

In a case in which pilotless flying object dn is present, detection result determiner 66 notifies output controller 35 of the fact that pilotless flying object dn is present (detection result of pilotless flying object dn) (S28).

Meanwhile, in step S27, in a case in which pilotless flying object dn is not present (NO in S27), detection result determiner 66 instructs scanning controller 67 to transition directivity setting direction BF2 of the scanning target in monitoring area 8 to the next different direction. Scanning controller 67 causes directivity setting direction BF2 of the scanning target in monitoring area 8 to transition to the next different direction (S29). The notification of the detection results of pilotless flying object dn may be performed at once after the scanning of all directions is completed instead of at the timing at which the detection process of a single directivity setting direction is completed.

The order in which directivity setting direction BF2 is caused to transition in order in monitoring area 8 may be a spiral-shaped (cyclone-shaped) order in directivity setting area BF1 of monitoring area 8 or the entire range of monitoring area 8, for example, to transition from an outside circumference toward an inside circumference, or to transition from an inside circumference to an outside circumference, as long as the area is other than the masking area set by masking area setter 69a.

Instead of scanning the directivity setting direction continually in a single sweep, detecting direction controller 68 may set the position in monitoring area 8 in advance and move directivity setting direction BF2 to each position in an arbitrary order, as long as the area is other than the masking area set by masking area setter 69a. Accordingly, monitoring apparatus 10 is capable of starting the detection process from positions at which pilotless flying object dn easily enter, for example, and it is possible to improve the efficiency of the detection process.

Scanning controller 67 determines whether or not the scanning is completed in all directions in monitoring area 8 (S30). In a case in which the scanning is not completed in all directions (NO in S30), the process of directivity processor 63 returns to step S23, and the same processes are performed. In other words, directivity processor 63 performs beam forming in directivity setting direction BF2 of the position which is moved in step S29, and subjects the sound data of directivity setting direction BF2 to an extraction process. Accordingly, since even if a single pilotless flying object dn is detected, the detection of pilotless flying objects dn which may also be present is continued, sound source detection unit UDk is capable of detecting a plurality of pilotless flying objects dn.

Meanwhile, when the scanning is completed in all directions in step S30 (YES in S30), directivity processor 63 erases the sound data which is temporarily stored in memory 38 and is collected by microphone array MAk (S31).

After the erasing of the sound data, signal processor 33 determines whether or not the detection process of pilotless flying objects dn is completed (S32). The completion of the detection process of pilotless flying objects dn is performed in accordance with a predetermined event. For example, in step S6, the number of times pilotless flying object dn was not detected is held in memory 38, and in a case in which the number of times is greater than or equal to a predetermined number, the detection process of pilotless flying objects dn may be completed. Signal processor 33 may complete the detection process of pilotless flying object dn based on a time expiration of a timer, or user operation of a user interface (UI) included in console 32. The detection process may be completed in a case in which the power of monitoring apparatus 10 is turned off.

In the process of step S24, frequency analyzer 64 analyses the frequency and measures the sound pressure of the frequency. Detection result determiner 66 may determine that pilotless flying object dn is approaching sound source detection unit UD when the sound pressure level which is measured by frequency analyzer 64 gradually increases with the passage of time.

For example, in a case in which the sound pressure level of a predetermined frequency which is measured at time t11 is smaller than the sound pressure level of the same frequency measured at time t12, which is later than time t11, the sound pressure is increasing with the passage of time, and pilotless flying object dn may be determined as approaching. The sound pressure level may be measured over three or more times, and pilotless flying object dn may be determined as approaching based on the transition of a statistical value (for example, a variance value, an average value, a maximum value, a minimum value, or the like).

In a case in which the measured sound pressure level is greater than a warning threshold, which is a warning level, detection result determiner 66 may determine that pilotless flying object dn entered a warning area.

The warning threshold is a greater value than above-described third threshold th3, for example. The warning area is the same area as monitoring area 8, or is an area which is contained in monitoring area 8 and is narrower than monitoring area 8, for example. The warning area is an area for which entrance by pilotless flying objects dn is restricted, for example. The approach determination and the entrance determination of pilotless flying objects dn may be executed by detection result determiner 66.

Figure 12:
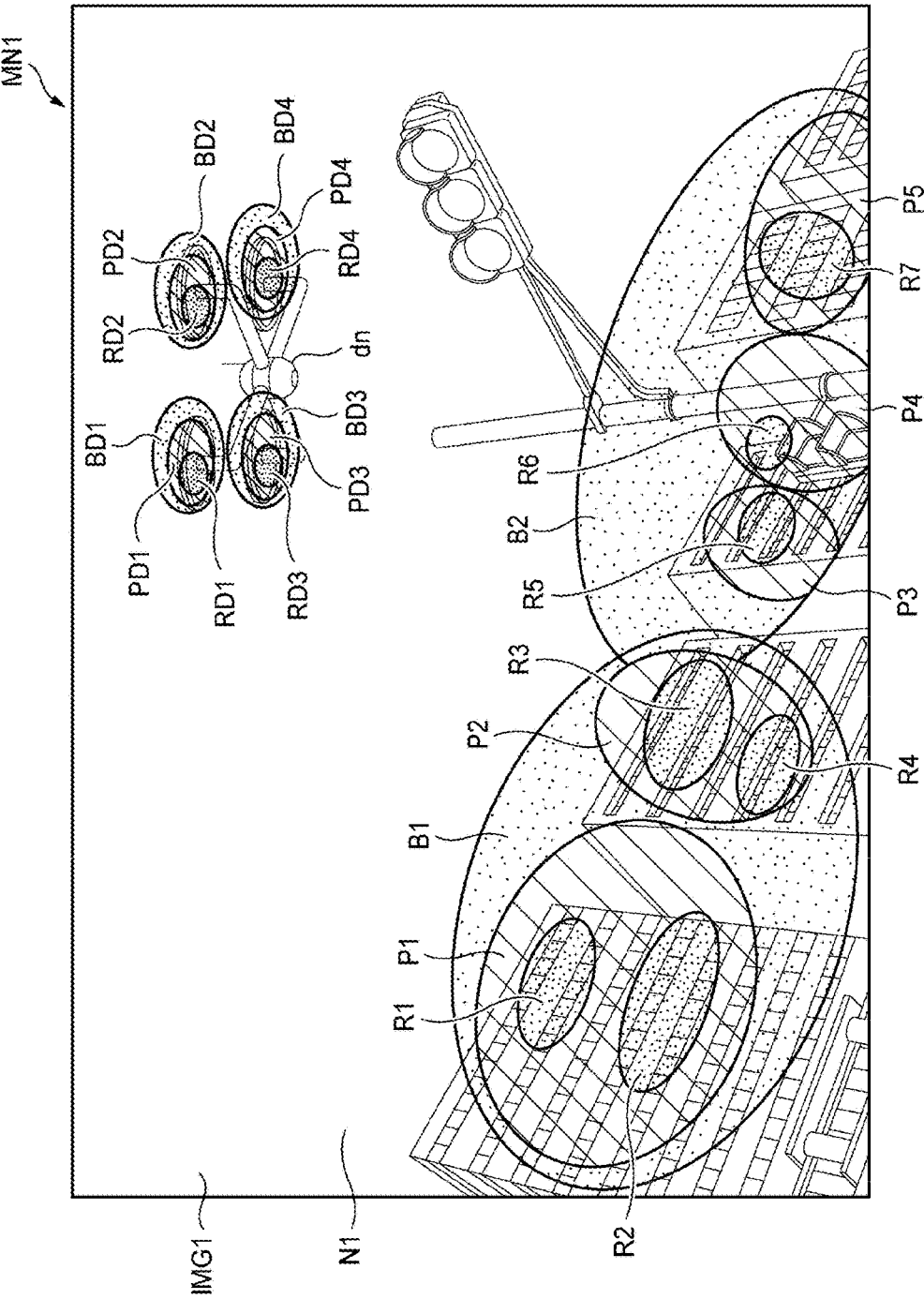
FIG. 12 is a diagram illustrating an example of a display screen of a first monitor in a case where a masking area is not set.

FIG. 12 is a diagram illustrating an example of a display screen of first monitor MN1 in a case where masking area MSK3 is not set. In FIG. 12, in first monitor MN1, pilotless flying object dn detected by monitoring apparatus 10 is visible on omnidirectional image IMG1 on the upper right side of the paper of FIG. 12. In addition, the sound pressure heat map respectively corresponding to the sound sources generated by pilotless flying object dn or in the range of an imaging angle of view of omnidirectional camera CAk is superimposed and displayed.

As described with reference to FIG. 9, in the exemplary embodiment, if the sound pressure value on a per-pixel basis calculated by sound source direction detector 34 is less than or equal to first threshold th1, the area is displayed colorless, if the sound pressure value is greater than first threshold th1 and is less than or equal to second threshold th2, the area is displayed in blue, if the sound pressure value is greater than second threshold th2 and less than or equal to third threshold th3, the area is displayed in pink, and if the sound pressure value is greater than third threshold th3, the area is displayed in red.

In FIG. 12, for example, in the vicinity of the rotary blade or the rotor around the body center of pilotless flying object dn, since the sound pressure value is greater than third threshold th3, the areas are rendered by red areas RD1, RD2, RD3, and RD4. Similarly, the areas around the red areas are rendered by pink areas PD1, PD2, PD3, and PD4 which indicate that the sound pressure value is the greatest next to the red area. Similarly, the areas around the pink areas are rendered by blue areas BD1, BD2, BD3, and BD4 which indicate that the sound pressure value is the greatest next to the pink area.

In addition, FIG. 12 illustrates that the sound source is also present in office buildings, and pixels at which the sound pressure value on a per-pixel basis calculated by sound source direction detector 34 is greater than third threshold th3 or sets of such pixels are rendered by red areas R1, R2, R3, R4, R5, R6, and R7. Similarly, the areas around the red areas of the office buildings are rendered by pink areas P1, P2, P3, P4, and P5 which indicate that the sound pressure value is the greatest next to the red area. Similarly, the areas around the pink areas of the office buildings are rendered by blue areas B1 and B2 which indicate that the sound pressure value is the greatest next to the pink area. Other areas in omnidirectional image IMG1 are rendered by colorless area N1 since the sound pressure value is less than or equal to first threshold th1, and thus do not cause deterioration of visibility of omnidirectional image IMG1 which is the background.

Figure 13:
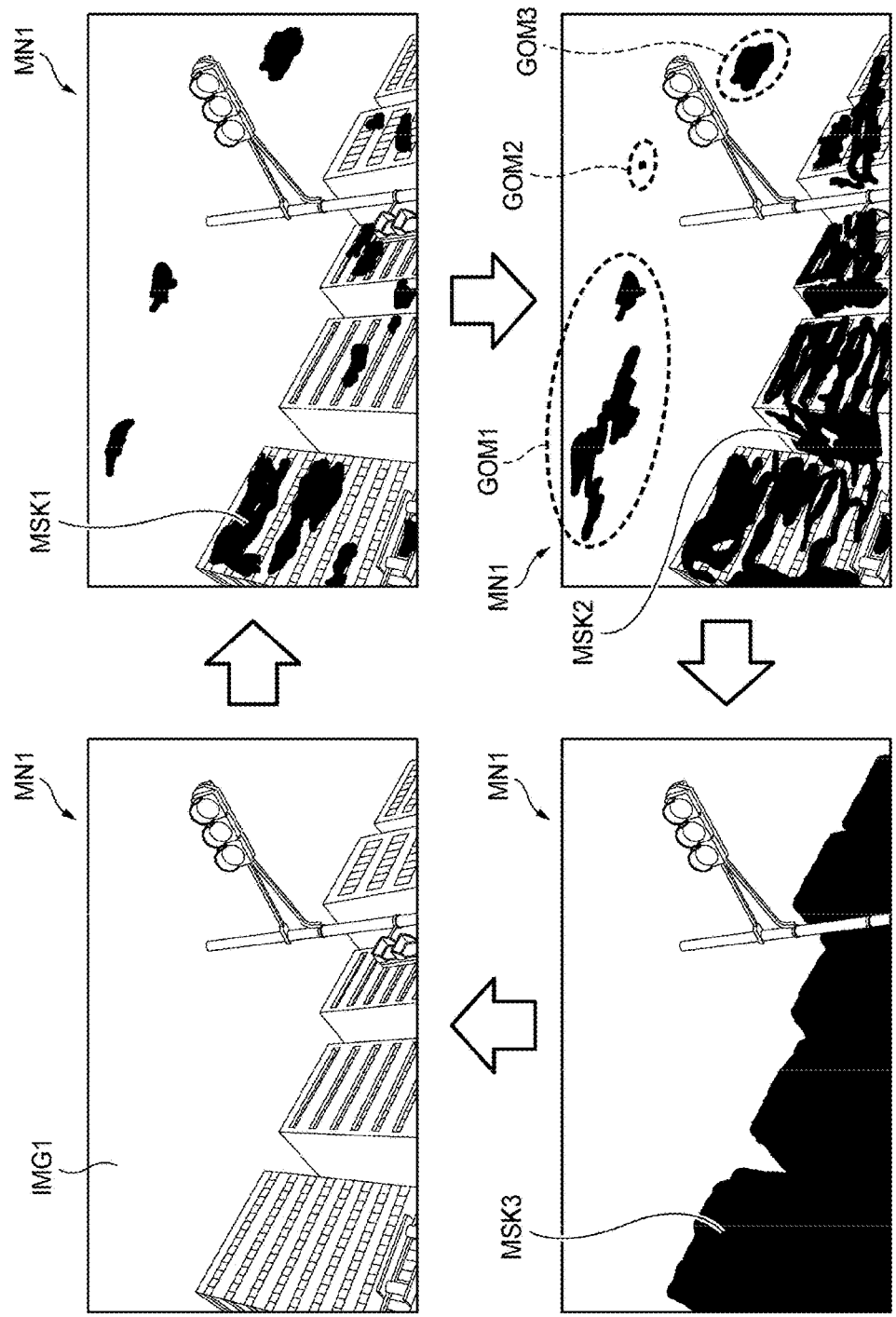
FIG. 13 is an explanatory diagram illustrating an example of a display of the masking area at the time of performing an automatic learning process, in time series.
Figure 14:
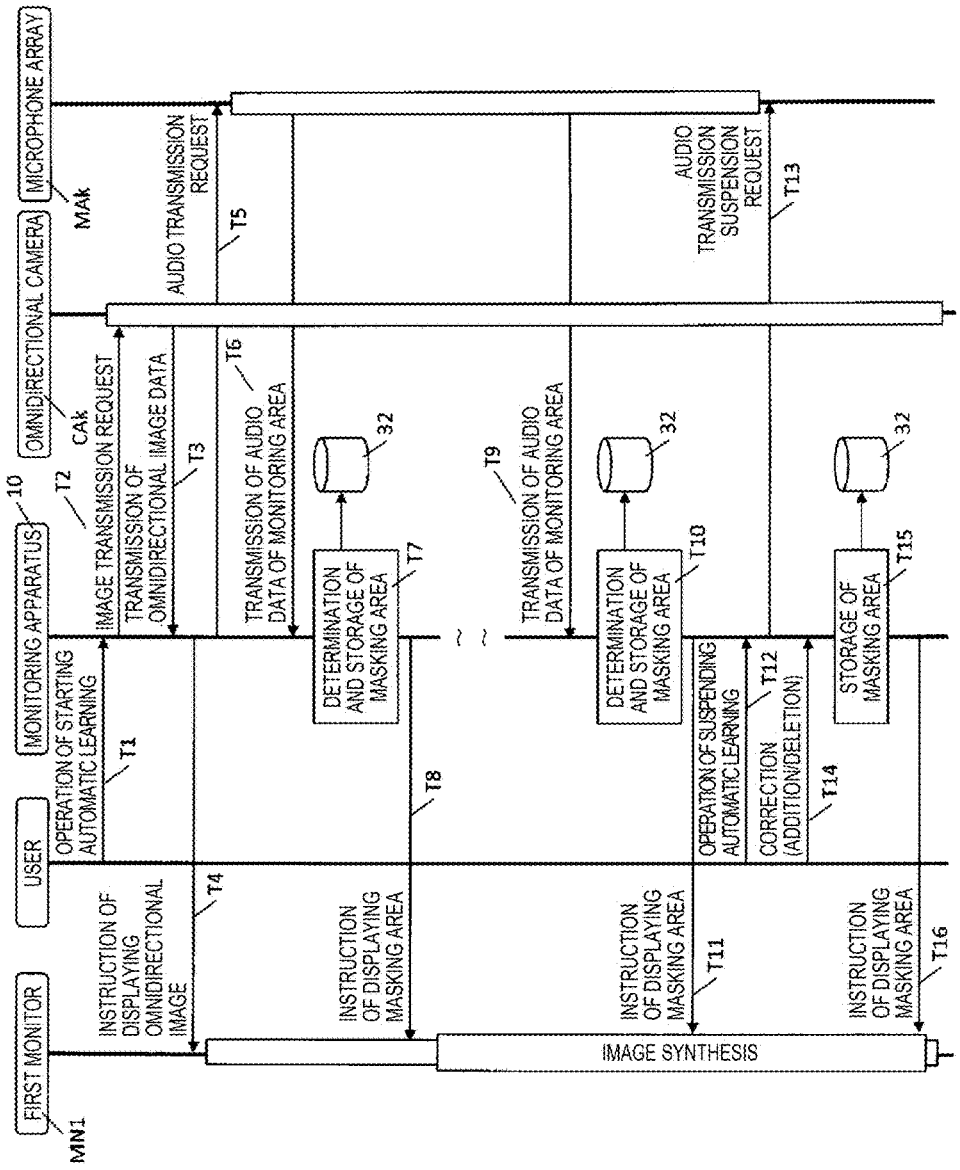
FIG. 14 is a sequence diagram illustrating an example of an operation procedure of setting the masking area in the first exemplary embodiment.
Figure 15:
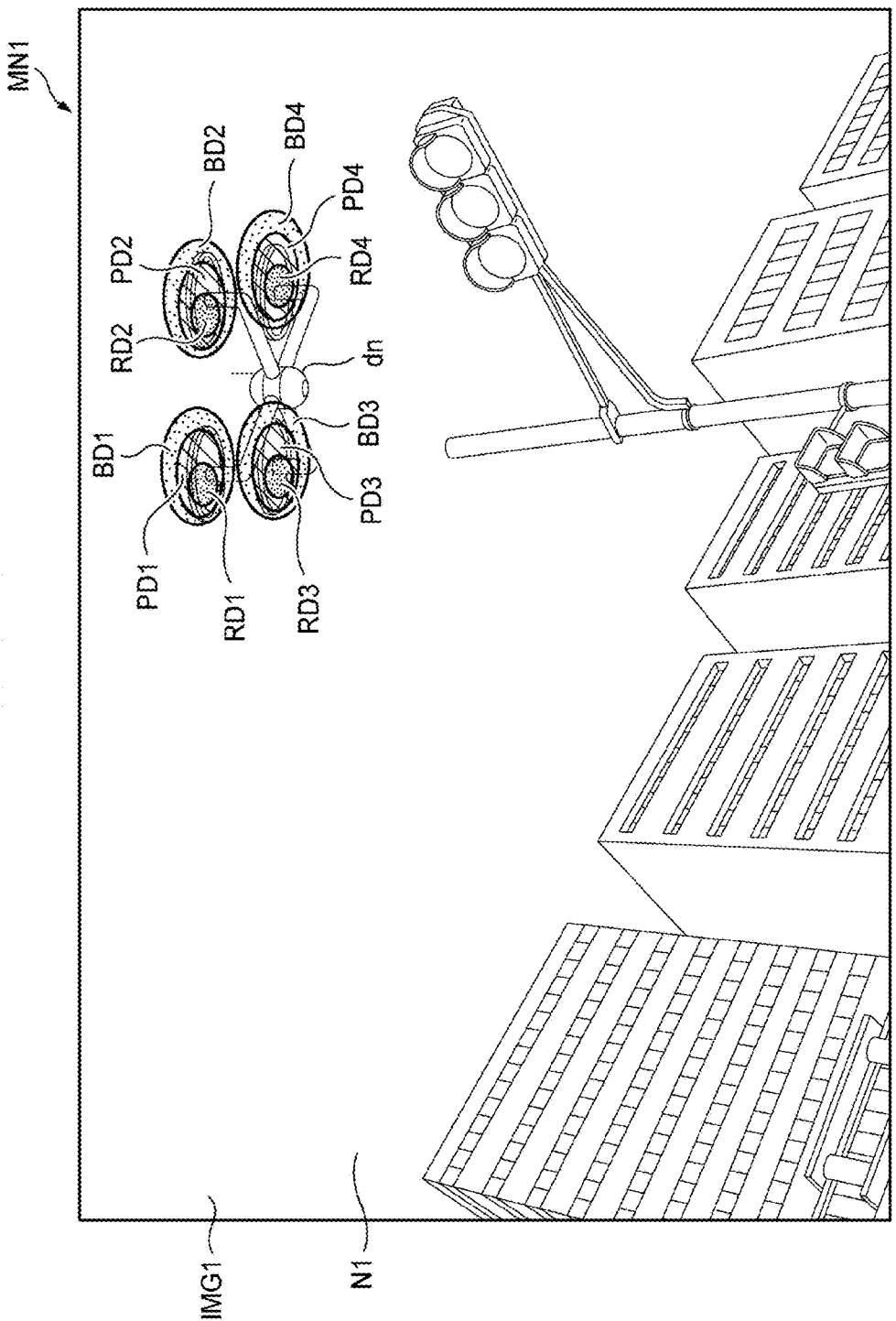
FIG. 15 is a diagram illustrating an example of a display screen of the first monitor in a case where the masking area is set.

Next, the setting of the masking area in the exemplary embodiment will be described in detail with reference to FIGS. 13, 14, and 15. FIG. 13 is an explanatory diagram illustrating an example of a display of the masking area at the time of performing an automatic learning process, in time series. FIG. 14 is a sequence diagram illustrating an example of an operation procedure of setting the masking area in the first exemplary embodiment. FIG. 15 is a diagram illustrating an example of a display screen of the first monitor in a case where the masking area is set. The sequence illustrated in FIG. 14 is the so-called initial settings executed before the operation of the sequence illustrated in FIG. 9 is started.

In FIG. 14, the user instructs monitoring apparatus 10 to start the automatic learning process of the masking area by using console 32, for example (T1). Monitoring apparatus 10 performs an image transmission request in relation to omnidirectional camera CAk (T2). Omnidirectional camera CAk starts the imaging process corresponding to the input of power in accordance with the image transmission request. Omnidirectional camera CAk transmits the data of the omnidirectional image (for example, a still image or a video) which is obtained through imaging to monitoring apparatus 10 via network NW (T3). Monitoring apparatus 10 converts the omnidirectional image data which is transmitted from omnidirectional camera CAk into display data such as NTSC, outputs the display data to first monitor MN1, and instructs first monitor MN1 to display the omnidirectional image data (T4). In this manner, when the display data transmitted from monitoring apparatus 10 is input to first monitor MN1, first monitor MN1 displays the data of omnidirectional image IMG1 of omnidirectional camera CAk on the screen (refer to the upper left side of the paper of FIG. 13).

In addition, monitoring apparatus 10 performs an audio transmission request in relation to microphone array MAk (T5). Microphone array MA starts the sound collection process corresponding to the input of power in accordance with the audio transmission request. Microphone array MAk encodes the audio data of monitoring area 8 obtained through sound collection and transmits the encoded audio data to monitoring apparatus 10 via network NW (T6). In monitoring apparatus 10, sound source direction detector 34 calculates, as the sound parameter, the sound pressure on a per-pixel basis using the individual pixels which form the omnidirectional image data of monitoring area 8, based on the omnidirectional image data which is captured by omnidirectional camera CAk and the audio data which is collected by microphone array MAk.

Furthermore, masking area setter 69*a* determines pixels at which the calculated value of the sound pressure by sound source direction detector 34 is greater than or equal to a predetermined masking area threshold (for example, third threshold th3 described above) or sets of such pixels. Masking area setter 69*a* saves and registers information indicating the determined pixels or the determined sets of such pixels, as information indicating the masking area, in memory 38 (T7). Specifically, the information indicating the masking area is coordinates on the omnidirectional image which specify the position of a pixel at which the calculated value of the sound pressure is greater than or equal to the masking area threshold. Masking area setter 69a outputs, to first monitor MN1 via output controller 35, the information indicating the masking area and an instruction of causing the masking area (pixels at which the calculated value of the sound pressure is greater than or equal to the masking area threshold, or sets of such pixels) to be filled with a predetermined color (for example, red) (T8). In this manner, first monitor MN1 performs a process of filling the position of coordinates corresponding to masking area MSK1 on omnidirectional image IMG, with a predetermined color through the instruction transmitted from monitoring apparatus 10 (refer to the upper right side of the paper of FIG. 13). In omnidirectional image IMG1 on the upper right side of the paper of FIG. 13, masking area MSK1 indicates the entire area which is filled with a predetermined color.

Similarly, microphone array MA encodes the audio data of monitoring area 8 obtained through sound collection which is continuously being performed, and transmits the encoded audio data to monitoring apparatus 10 via network NW in accordance with the audio transmission request from monitoring apparatus 10 (T9). In monitoring apparatus 10, sound source direction detector 34 calculates, as the sound parameter, the sound pressure on a per-pixel basis using the individual pixels which form the omnidirectional image data of monitoring area 8, based on the omnidirectional image data which is captured by omnidirectional camera CAk and the audio data which is collected by microphone array MAk.

Furthermore, masking area setter 69a determines pixels at which the calculated value of the sound pressure by sound source direction detector 34 is greater than or equal to the masking area threshold or sets of such pixels. Masking area setter 69a saves and registers information indicating the determined pixels or the determined sets of such pixels, as information indicating the masking area, in memory 38 (T10). Masking area setter 69a outputs, to first monitor MN1 via output controller 35, the information indicating the masking area and the instruction of causing the masking area to be filled with a predetermined color (for example, red) (T11). In this manner, first monitor MN1 performs a process of filling the position of coordinates corresponding to masking area MSK2, which is accumulated on masking area MSK1, on omnidirectional image IMG, with a predetermined color through the instruction transmitted from monitoring apparatus 10 (refer to the lower right side of the paper of FIG. 13). In omnidirectional image IMG1 on the lower right side of the paper of FIG. 13, masking area MSK2 indicates the entire area which is filled with a predetermined color.

Here, the completion of the automatic learning process of the masking area is instructed to monitoring apparatus 10 through the user's operation using console 32 (T12). In accordance with the instruction, monitoring apparatus 10 transmits an audio transmission suspension request to microphone array MAk (T13). In this manner, microphone array MAk suspends the distribution (transmission) of the audio data of monitoring area 8, which is obtained through the sound collection, to monitoring apparatus 10.

In addition, if an operation of correcting the masking area (that is, addition or deletion of the masking area) is performed on first monitor MN1 on which masking area MSK2 of the lower right side of the paper of FIG. 13 is illustrated, through the user's operation using console 32 (T14), in monitoring apparatus 10, masking area setter 69a, through the user's operation, adds the designated position on omnidirectional image IMG1 as the masking area or deletes the designated position from the masking area, and then saves and registers information indicating masking area MSK3 after the correction, in memory 38 (T15).

In step T14, for example, an operation (for example, range designation operation) for deleting areas GOM1, GOM2, and GOM3, which are determined to be unnecessary as the masking area by the user, or an operation (for example, rendering operation) for adding the entire area of office buildings of the background covered by masking area MSK2 as the masking area is performed on first monitor MN1 on which masking area MSK2 of the lower right side of the paper of FIG. 13 is illustrated.

Masking area setter 69a outputs, to first monitor MN1 via output controller 35, the information indicating the masking area and the instruction of causing the masking area to be filled with a predetermined color (for example, red) (T16). In this manner, first monitor MN1 performs a process of filling the position of coordinates corresponding to masking area MSK3, which is accumulated on masking areas MSK1 and MSK2, on omnidirectional image IMG, with a predetermined color through the instruction transmitted from monitoring apparatus 10 (refer to the lower left side of the paper of FIG. 13). In omnidirectional image IMG1 on the lower left side of the paper of FIG. 13, masking area MSK3 indicates the entire area which is filled with a predetermined color. Accordingly, the sky is excluded from the setting of masking area MSK3.

According to the sequence illustrated in FIG. 14, in view of a tendency in which pilotless flying object dn as the detection target of the exemplary embodiment flies in the sky around which the sound sources are rarely present in the range of the imaging angle of view of omnidirectional camera CAk, since no sound source in which the sound pressure greater than or equal to the masking area threshold is generated, is found in the sky according to the analysis of the audio data from microphone array MAk, it is possible to set the sky as the detection target of pilotless flying object dn. Meanwhile, by setting the entire area of office buildings around which plural sound sources may present, as the masking area, it is possible to prevent the sound source other than pilotless flying object dn from being erroneously detected as pilotless flying object dn which is originally desired to be detected, and it is possible to improve the detection precision and the speed of the detection process for pilotless flying object dn.

In other words, as illustrated in FIG. 15, in omnidirectional image IMG1, detection of pilotless flying object dn is performed only in other areas except for masking area MSK3. As a result, in comparison with omnidirectional image IMG1 illustrated in FIG. 12, a sound pressure heat map in which a sound pressure value of the sound generated at the sound source position is converted into the visual image is superimposed and displayed on the sound source position around pilotless flying object dn detected in other areas except for masking area MSK3. Meanwhile, superimposition and display of the sound pressure heat map in which a sound pressure value of the sound generated at the sound source position is converted into the visual image, is omitted for areas around other sound sources (for example, angry voice of a person in office buildings) which are detected in masking area MSK3 but are not the pilotless flying object.

In the exemplary embodiment, in a case where the masking area is set by masking area setter 69a, as illustrated in FIG. 15, the sound pressure heat map in which a sound pressure value of the sound generated at the sound source position is converted into the visual image, is superimposed and displayed around pilotless flying object dn. However, in a case where the masking area is not set by masking area setter 69a, as illustrated in FIG. 12, the sound pressure heat map corresponding to the sound pressure value of the detected sound source may be superimposed and displayed on omnidirectional image IMG1.

As described above, in pilotless flying object detection system 5 according to the exemplary embodiment, monitoring apparatus 10 sets, by masking area setter 69a, a masking area to be excluded from the detection of pilotless flying object dn, which appears in the captured image (omnidirectional image IMG1) of monitoring area 8 by using the audio data collected by microphone array MAk. Monitoring apparatus 10 detects pilotless flying object dn in other areas except for the masking area by using the audio data collected by microphone array MAk and information indicating the masking area. In addition, in a case where pilotless flying object dn is detected in an area other than the masking area, monitoring apparatus 10 superimposes a sound source visual image (that is, visual images of red area RD1, pink area PD1, blue area BD1, and the like) which indicate the volume of the sound of the sound source position, at the sound source position of pilotless flying object dn in omnidirectional image IMG1 and displays the result on first monitor MN1.

In this manner, since in pilotless flying object detection system 5, it is possible to automatically set a masking area to be excluded from the detection process of pilotless flying object dn as the detection target, with respect to monitoring area 8 as the imaging target of omnidirectional camera CAk, it is possible to reduce the possibility of erroneously detecting an object at the sound source position in the masking area as pilotless flying object dn, and to suppress deterioration of the detection precision of pilotless flying object dn. In addition, in pilotless flying object detection system 5, it is preferable that the detection determination of pilotless flying object dn is performed only for the areas except for the masking area, without the necessity of detecting pilotless flying object dn over the imaging angle of view (that is, entire region of omnidirectional image IMG1) of omnidirectional camera CAk, and thus it is possible to further enhance the detection process of pilotless flying object dn.

In addition, in pilotless flying object detection system 5, sound source direction detector 34 calculates the sound pressure specifying the volume of the sound of monitoring area 8 on a per-predetermined-unit basis of pixels, which form omnidirectional image IMG1, based on the audio data collected by microphone array MAk. Masking area setter 69a superimposes and displays a position of the sound source in which the calculated value of the sound pressure is greater than or equal to the masking area threshold relating to the volume of the sound, or an area including the position, on first monitor MN1, and further, sets the sound source area displayed on first monitor MN1 as the masking area through the user's confirmation operation. In this manner, it is possible for the user to easily set a place where the possibility of the flying of pilotless flying object do is low but other sound sources (for example, angry voice of a person) may be generated, as the masking area to be excluded from areas of the detection target of pilotless flying object do while visually checking first monitor MN1.

In addition, masking area setter 69a sets the sound source area after the user's adding operation as the masking area through the user's adding operation for further adding the sound source area (that is, areas as candidates for the masking area) displayed on first monitor MN1. In this manner, it is possible for the user to set the masking area by easily designating a location that the user desires to add as the masking area under the user's determination, while visually checking the location, which is automatically filled with a predetermined color as the candidate for the masking area by monitoring apparatus 10, on first monitor MN1, and thus the usability of the user is improved.

In addition, masking area setter 69a sets the sound source area after the user's deleting operation as the masking area through the user's deleting operation for deleting at least a part of the sound source area (that is, areas as candidates for the masking area) displayed on first monitor MN1. In this manner, it is possible for the user to set the masking area by easily designating a part of a location that the user desires to exclude from the location filled with a predetermined color as the masking area, under the user's determination, while visually checking the location, which is automatically filled with a predetermined color as the candidate for the masking area by monitoring apparatus 10, on first monitor MN1, and thus the usability of the user is improved.

In addition, output controller 35 superimposes the sound source visual image, in which the sound pressure is converted into a different visual image in stages according to comparison between the calculated value of the sound pressure and a plurality of thresholds relating to the volume of the sound, on a per-predetermined-unit basis of pixels which form omnidirectional image IMG1 of monitoring area 8 and displays the result on first monitor MN1. In this manner, by viewing first monitor MN1, it is possible for the user to not only acknowledge a broad range of a situation of monitoring area 8 as the omnidirectional image, but also easily check the place of the generation source (for example, pilotless flying object dn) of the sound generated in an area other than the masking area of monitoring area 8 and the volume of the sound, as the visual image, in omnidirectional image IMG1 of monitoring area 8 captured by omnidirectional camera CAk.

History Leading to Second Exemplary Embodiment

Japanese Patent Unexamined Publication No. 2006-168421 described above discloses that a sound pressure in a frequency unique to the flying object such as a helicopter or Cessna is compared with a predetermined set level, and if the sound pressure is greater than or equal to the set level, it is determined to be the flying object as the monitoring target.

However, in Japanese Patent Unexamined Publication No. 2006-168421 described above, it is not considered to quantitatively illustrate the level to which the measured sound pressure corresponds, of the sound pressure in which a plurality of levels are prescribed. Thus, there is a problem in that when any sound is detected in the imaging area of the camera device, it is difficult to specifically present the volume of the sound as detailed visual information for sound, regardless of the magnitude of the volume of the detected sound at the sound source position.

Therefore, a second exemplary embodiment describes an example of a monitoring system which presents in detail, in stages, the volume of the detected sound at the sound source position in the imaging area of the camera device, regardless of the magnitude of the volume of the sound at the sound source position, and assists the user in accurately ascertaining the volume of the sound at the sound source position.

Second Exemplary Embodiment

In the second exemplary embodiment, since the internal configuration of each device configuring pilotless flying object detection system 5 is the same as the internal configuration of each device configuring pilotless flying object detection system 5 according to the first exemplary embodiment, the same reference numeral is assigned to the same contents and the description of the same contents is not repeated, and different contents will be described.

In the second exemplary embodiment, after generating and displaying the sound pressure heat map on first monitor MN1 described in the first exemplary embodiment, monitoring apparatus 10 analyzes in detail, the sound pressure heat map according to the relationship between the calculated value of the sound pressure which is required for generating the sound pressure heat map and a plurality of thresholds (refer to later description) and displays the result, through the user's operation with respect to console 32 (refer to later description). Hereinafter, three analysis methods will be described.

First Analysis Method

Figure 16:
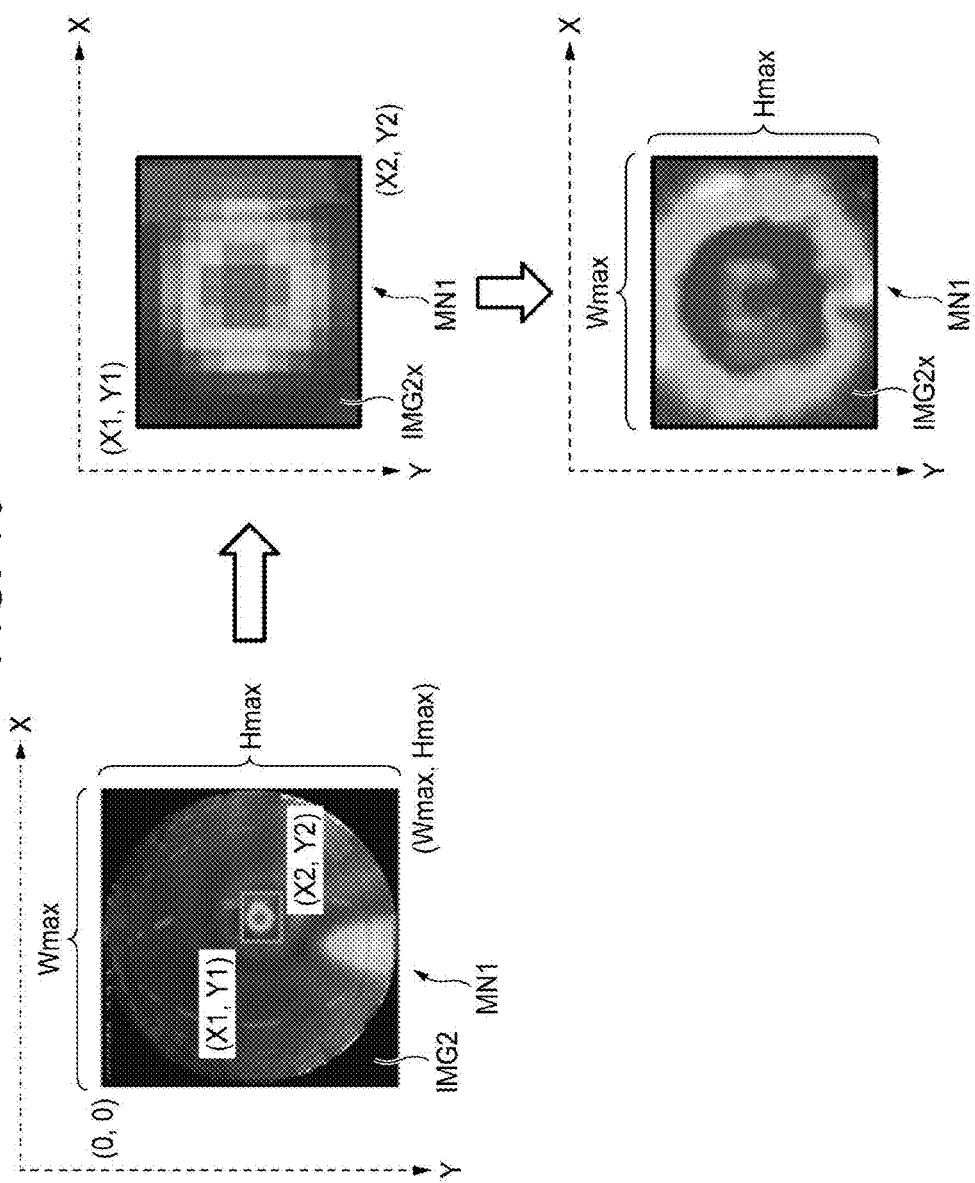
FIG. 16 is an explanatory diagram illustrating an outline of a dynamic change of a display resolution of a sound pressure heat map in a second exemplary embodiment.
Figure 17:
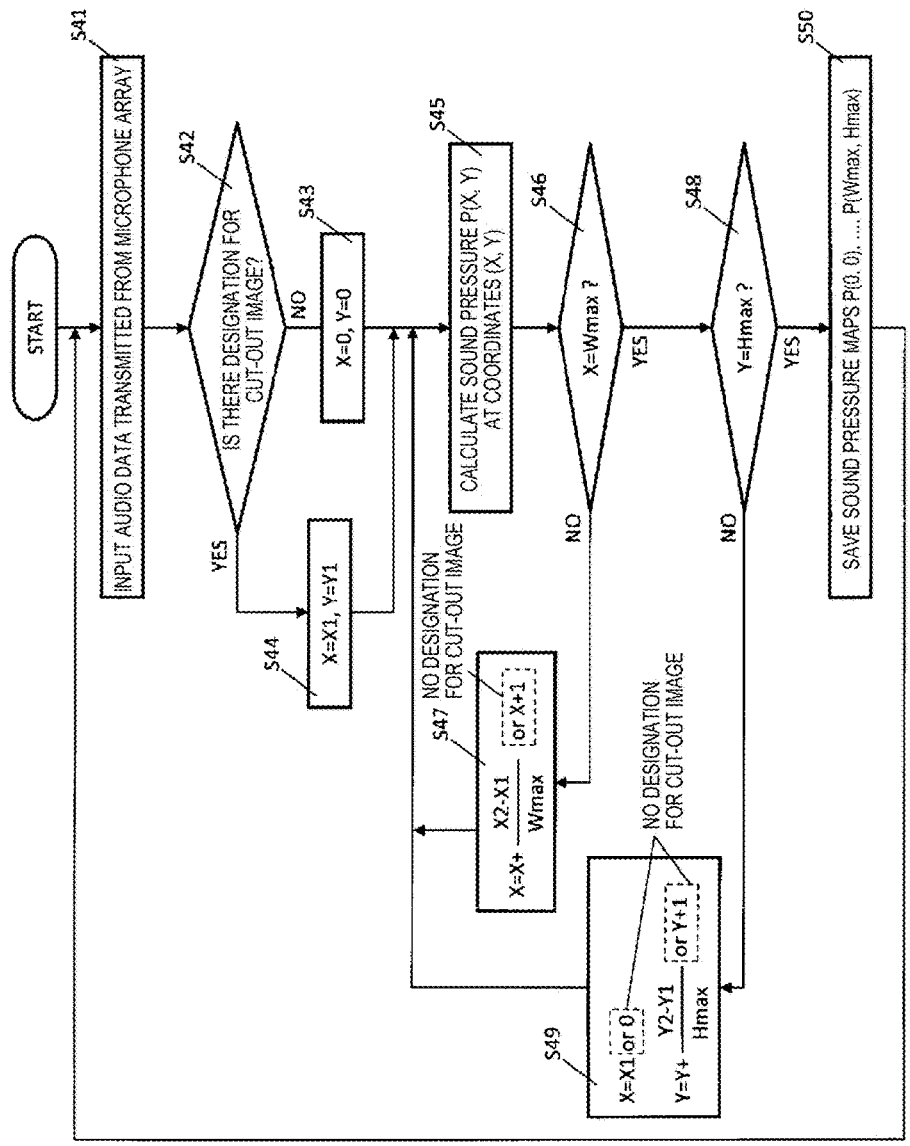
FIG. 17 is a flowchart illustrating an example of an operation procedure of the dynamic change of the display resolution of the sound pressure heat map in the second exemplary embodiment.

In the first analysis method, after monitoring apparatus 10 superimposes the sound pressure heat map corresponding to omnidirectional image IMG2, onto omnidirectional image IMG2 and displays the result on first monitor MN1, if the user designates a partial range of omnidirectional image IMG2, monitoring apparatus 10 changes the display resolution of the sound pressure heat map of the designated range to be the same as the display resolution of omnidirectional image IMG2 which is the entire image. The operation example of the first analysis method will be described with reference to FIGS. 16 and 17. FIG. 16 is an explanatory diagram illustrating an outline of a dynamic change of the display resolution of the sound pressure heat map in the second exemplary embodiment. FIG. 17 is a flowchart illustrating an example of an operation procedure of the dynamic change of the display resolution of the sound pressure heat map in the second exemplary embodiment.

In FIG. 17, monitoring apparatus 10 receives the audio data of monitoring area 8 transmitted from microphone array MAk, as an input (S41). It is determined whether or not a partial cut-out range of omnidirectional image IMG2 (refer to the upper left side of the paper of FIG. 16) is designated with respect to first monitor MN1 through the user's operation using console 32 (S42).

Here, in the upper left side of the paper of FIG. 16, omnidirectional image IMG2 displayed on first monitor MN1 has a display resolution of "Wmax×Hmax" in a case where the display size of omnidirectional image IMG2 in an X direction is "Wmax" and the display size in a Y direction is "Hmax". In addition, the coordinates of endpoints of the partial cut-out range of omnidirectional image IMG2, which is designated by the user's operation, are (X1, Y1), (X1, Y2), (X2, Y1), and (X2, Y2) to form a rectangular shape. FIG. 16 illustrates only (X1, Y1) and (X2, Y2) which are present on the diagonal of the rectangular shape.

In a case where a rectangular shape of which the endpoints are four points of (X1, Y1), (X1, Y2), (X2, Y1), and (X2, Y2) is not designated by the user's operation (NO in S42), in order to generate a sound pressure map for the entirety of omnidirectional image IMG2, sound source direction detector 34 of monitoring apparatus 10 sets (X, Y)=(0, 0) (S43), and calculates sound pressure P(X, Y) at the coordinates of (X, Y)=(0, 0) (S45).

In a case where the X coordinate of omnidirectional image IMG2 does not match maximum value Wmax (NO in S46), in order to generate a sound pressure map for the entirety of omnidirectional image IMG2, sound source direction detector 34 increases the X coordinate by one (S47), and calculates sound pressure P(X, Y) for the coordinates (X, Y) after the increase.

In a case where the X coordinate of omnidirectional image IMG2 matches maximum value Wmax (YES in S46), in a case where the Y coordinate of omnidirectional image IMG2 does not match maximum value Hmax (NO in S48), in order to generate a sound pressure map for the entirety of omnidirectional image IMG2, sound source direction detector 34 causes the X coordinate to return to 0, and increases the Y coordinate by one (S49), and calculates sound pressure P(X, Y) for the coordinates (X, Y) after the increase. Sound source direction detector 34 repeats each process of steps S45 to S49 until the Y coordinate of omnidirectional image IMG2 matches maximum value Hmax, and thereby, can generate a sound pressure map for the entirety of omnidirectional image IMG2, and saves and registers the sound pressure map in memory 38 (S50), similar to the first exemplary embodiment.

Meanwhile, in a case where a rectangular shape of which the endpoints are four points of (X1, Y1), (X1, Y2), (X2, Y1), and (X2, Y2) is designated by the user's operation (YES in S42), in order to generate a sound pressure map for the range designated by the user's operation among omnidirectional image IMG2, sound source direction detector 34 of monitoring apparatus 10 sets (X, Y)=(X1, Y1) (S44), and calculates sound pressure P(X, Y) for the coordinates of (X, Y)=(X1, Y1) (S45).

Furthermore, in a case where the X coordinate of omnidirectional image IMG2 does not match maximum value Wmax (NO in S46), in order to generate a sound pressure map for the range designated by the user's operation among omnidirectional image IMG2, sound source direction detector 34 increases the X coordinate by (X2−X1)/Wmax (S47), and calculates sound pressure P(X, Y) for the coordinates (X, Y) after the increase.

In a case where the X coordinate of omnidirectional image IMG2 matches maximum value Wmax (YES in S46), in a case where the Y coordinate of omnidirectional image IMG2 does not match maximum value Hmax (NO in S48), in order to generate a sound pressure map for the range designated by the user's operation among omnidirectional image IMG2, sound source direction detector 34 causes the X coordinate to return to X1, and increases the Y coordinate by (Y2−Y1)/Hmax (S49), and calculates sound pressure P(X, Y) for the coordinates (X, Y) after the increase. Sound source direction detector 34 repeats each process of steps S45 to S49 until the Y coordinate of omnidirectional image IMG2 matches maximum value Hmax, and thereby, can generate a sound pressure map for the range designated by the user's operation among omnidirectional image IMG2, and saves and registers the sound pressure map in memory 38 (S50). After step S50, the process of monitoring apparatus 10 returns to step S41, and repeats the processes of steps S42 to S50 for the audio data which is input in step S41.

Accordingly, as illustrated in the upper right side of the paper of FIG. 16, if monitoring apparatus 10 simply cuts out the range designated by the user's operation, generates an audio heat map according to the sound pressure value on a per-pixel basis using pixels which form the cut-out range, and superimposes the result on first monitor MN1, only an image with a low (that is, rough) display resolution is displayed.

However, by the first analysis method of the exemplary embodiment, monitoring apparatus 10 calculates sound pressure P(X, Y) for the partial cut-out range of omnidirectional image IMG2 designated by the user's operation, on a per-fine unit basis (that is, for every (X2−X1)/Wmax in the X direction, and for every (Y2−Y1)/Hmax in the Y direction) such that the display resolution of the cut-out range is the same as the display resolution of the entirety of omnidirectional image IMG2. In this manner, as illustrated in the lower right side of the paper of FIG. 16, monitoring apparatus 10 can accurately display the sound pressure heat map of the cut-out range designated by the user's operation on first monitor MN1 with a resolution (unit) finer than the display resolution of the sound pressure heat map when simply cutting out the range, and thus can cause the user to accurately ascertain the details of the distribution of the sound sources in the cut-out range designated by the user's operation.

Second Analysis Method

Figure 19A:
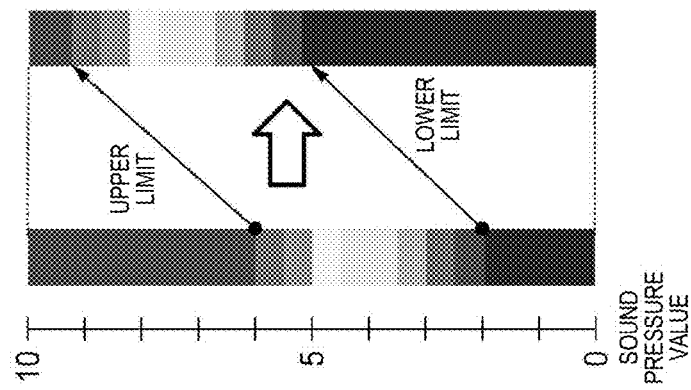
FIG. 19A is an explanatory diagram illustrating an outline of a setting change of inter-threshold widths defining the use of a sound source visual image in the second exemplary embodiment.
Figure 19B:
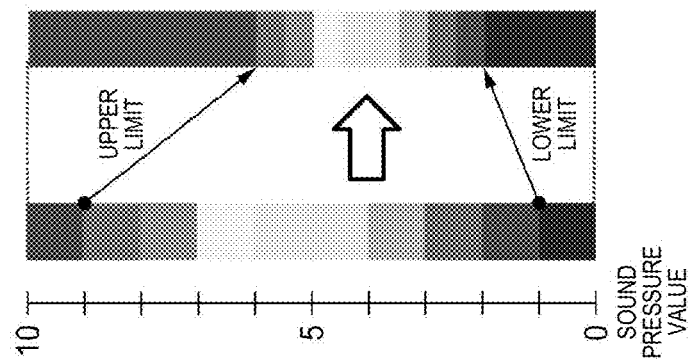
FIG. 19B is an explanatory diagram illustrating an outline of the setting change of the inter-threshold widths defining the use of the sound source visual image in the second exemplary embodiment.
Figure 20:
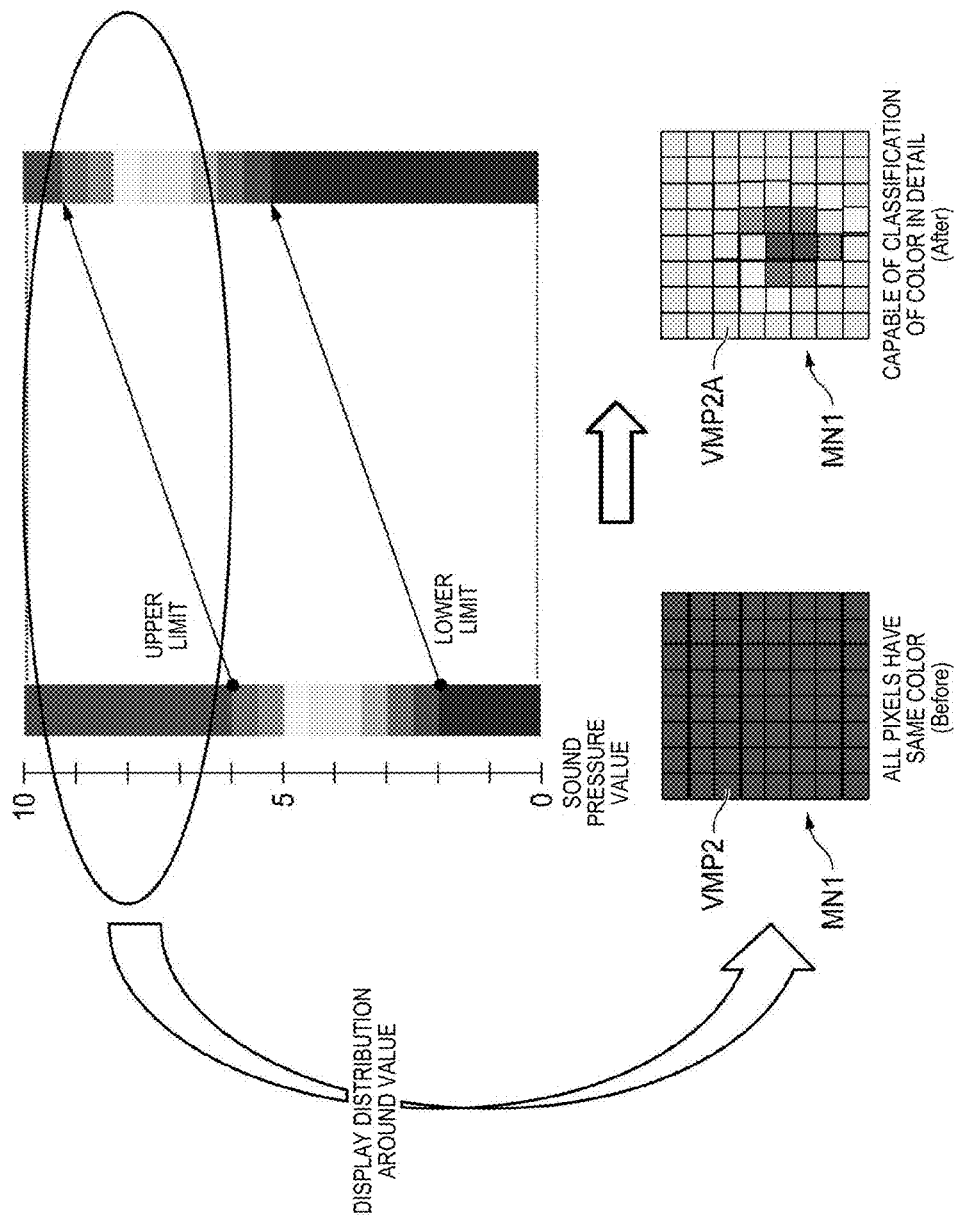
FIG. 20 is an explanatory diagram illustrating an outline of a display of the captured image accompanied by a setting change of inter-threshold widths defining the use of a crimson image and an ultramarine image in the second exemplary embodiment.

In the exemplary embodiment, before the description of the second analysis method, as maters in common in FIGS. 18 to 20, a plurality of inter-threshold widths which define the volume of the sound in stages will be described. FIG. 18 is an explanatory diagram illustrating an outline of width adjustment of thresholds according to a frequency distribution of sound pressure values, and a display result of a captured image accompanied by the width adjustment in the second exemplary embodiment. In FIGS. 18 to 20, it is defined that as the sound source visual images corresponding to the inter-thresholds, an ultramarine image, an indigo image, a blue image, a sky blue image, a bluish green image, a yellowish green image, a yellow image, an orange image, a red image, and a crimson image are used as the sound pressure value is toward the upper limit from the lower limit. In a case where the sound pressure value is the minimum (that is, lower limit), the ultramarine image is used, and in a case where the sound pressure value is the maximum (that is, upper limit), the crimson image is used.

For example, as illustrated in the left side of the paper of FIG. 18, ten thresholds are defined in total so as to correspond to the volume of the sound pressure value, and in the example on left side of the paper of FIG. 18, scales provided to the axis of each sound pressure value correspond to thresholds, respectively. Therefore, in the example on the left side of the paper of FIG. 18, in a case where the sound pressure value is included between a certain threshold (for example, 5) and a threshold (for example, 6) that is great next to the certain threshold, a color image (for example, the yellowish green image) corresponding to the inter-threshold in which the sound pressure value is included is used as the sound source visual image for visually indicating the sound pressure value when the sound pressure heat map is generated.

In the second analysis method, threshold adjuster 69b of monitoring apparatus 10 dynamically changes ten thresholds in total or inter-threshold widths thereof, based on the frequency of generation (in other words, the frequency distribution) of the sound pressure value, which is calculated on the per-pixel basis (also possible on the per-predetermined-unit basis, the same applies to the following) using pixels which form the omnidirectional image when output controller 35 generates the sound pressure heat map corresponding to the omnidirectional image. That is, threshold adjuster 69b dynamically changes the setting of the correspondence relationship between a plurality of thresholds and the sound source visual images according to the omnidirectional image. For example, with reference to FIG. 18, threshold adjuster 69b holds the setting in which the yellowish green image is used as the sound source visual image if the sound pressure value is between threshold 5 and threshold 6. However, if the frequency of appearance of the sound pressure value between threshold 5 and threshold 6 is high among pixels of the entirety of the omnidirectional image, threshold adjuster 69b changes inter-threshold width LG1 (for example, between threshold 5 and threshold 6) for using the yellowish green image to width LG2 (for example, between threshold 4.5 and threshold 4.8) which is narrower than width LG1.

Accordingly, in a case where the sound pressure values on the per-pixel basis of pixels which form the omnidirectional image are concentrated on inter-threshold width AR1 for using an image with a specific color, as illustrated in the lower left side of the paper of FIG. 18, as sound pressure heat map VMP1, images with the same color or images with visually similar colors (for example, the yellowish green image and the bluish green image) are used as the sound source visual images, and thus it is difficult to present in detail, to a user, the distribution of the sound sources appearing in the omnidirectional image.

However, according to the second analysis method of the exemplary embodiment, monitoring apparatus 10 dynamically changes the setting of the correspondence relationship between the sound source visual images and a plurality of thresholds according to the frequency of appearance (frequency distribution) of the sound pressure value on a per-pixel basis using the pixels which form the omnidirectional image by threshold adjuster 69b, reflects the change, and then displays sound pressure heat map VMP2 corresponding to the omnidirectional image on first monitor MN1. In this manner, as illustrated in the lower right side of the paper of FIG. 18, monitoring apparatus 10 can present to a user, a detailed distribution of the sound pressures as sound pressure heat map VMP2, and thus can cause the user to accurately ascertain the distribution of the sound source position.

Third Analysis Method

In the third analysis method, monitoring apparatus 10 can arbitrarily designate the upper limit, the lower limit or both the limits of the thresholds, which are for defining the use of the sound source visual image (that is, color image), through the user's operation using console 32. FIGS. 19A and 19B are explanatory diagrams illustrating an outline of a setting change of inter-threshold widths defining the use of the sound source visual image in the second exemplary embodiment.

For example, in FIG. 19A, the inter-threshold (upper end threshold) width for defining the use of the sound source visual image (that is, the crimson image) indicating that the sound pressure value is the highest (that is, the upper limit) is changed from between threshold 9 and threshold 10, to between threshold 6 and threshold 10, and further, the inter-threshold (lower end threshold) width for defining the use of the sound source visual image (that is, the ultramarine image) indicating that the sound pressure value is the lowest (that is, the lower limit) is changed from between threshold 0 and threshold 1, to between threshold 0 and threshold 2. In this manner, monitoring apparatus 10 can change the inter-threshold widths such that the widths between the remaining eight thresholds are different from the two inter-threshold widths changed by the user's operation by dynamically changing the inter-threshold widths for the remaining eight thresholds to be equal intervals.

In FIG. 19B, after the widths are changed as illustrated in FIG. 19A, the inter-threshold (upper end threshold) width for defining the use of the sound source visual image (that is, the crimson image) indicating that the sound pressure value is the highest (that is, the upper limit) is changed from between threshold 6 and threshold 10, to between threshold 9.3 and threshold 10, and further, the inter-threshold (lower end threshold) width for defining the use of the sound source visual image (that is, the ultramarine image) indicating that the sound pressure value is the lowest (that is, the lower limit) is changed from between threshold 0 and threshold 2, to between threshold 0 and threshold 5. In this manner, similarly, monitoring apparatus 10 can change the inter-threshold widths such that, though each threshold is different from the example illustrated in FIG. 19A, the widths between the remaining eight thresholds are different from the two inter-threshold widths changed by the user's operation by dynamically changing the inter-threshold widths for the remaining eight thresholds to be equal intervals.

In FIGS. 19A and 19B, examples are described in which both the inter-threshold (upper end threshold) width for defining the use of the sound source visual image (that is, the crimson image) indicating that the sound pressure value is the highest (that is, the upper limit) and the inter-threshold (lower end threshold) width for defining the use of the sound source visual image (that is, the ultramarine image) indicating that the sound pressure value is the lowest (that is, the lower limit) are changed, but the same applies to a case in which only one is changed.

That is, in a case where only the inter-threshold(upper end threshold) width for defining the use of the sound source visual image (that is, the crimson image) indicating that the sound pressure value is the highest (that is, the upper limit) is changed, similarly, monitoring apparatus 10 can change the inter-threshold widths such that the widths between the remaining nine thresholds are different from the one inter-threshold width changed by the user's operation by dynamically changing the inter-threshold widths for the remaining nine thresholds to be equal intervals.

In addition, in a case where only the inter-threshold (lower end threshold) width for defining the use of the sound source visual image (that is, the ultramarine image) indicating that the sound pressure value is the lowest (that is, the lower limit) is changed, similarly, monitoring apparatus 10 can change the inter-threshold widths such that the widths between the remaining nine thresholds are different from the one inter-threshold width changed by the user's operation by dynamically changing the inter-threshold widths for the remaining nine thresholds to be equal intervals.

Figure 21:
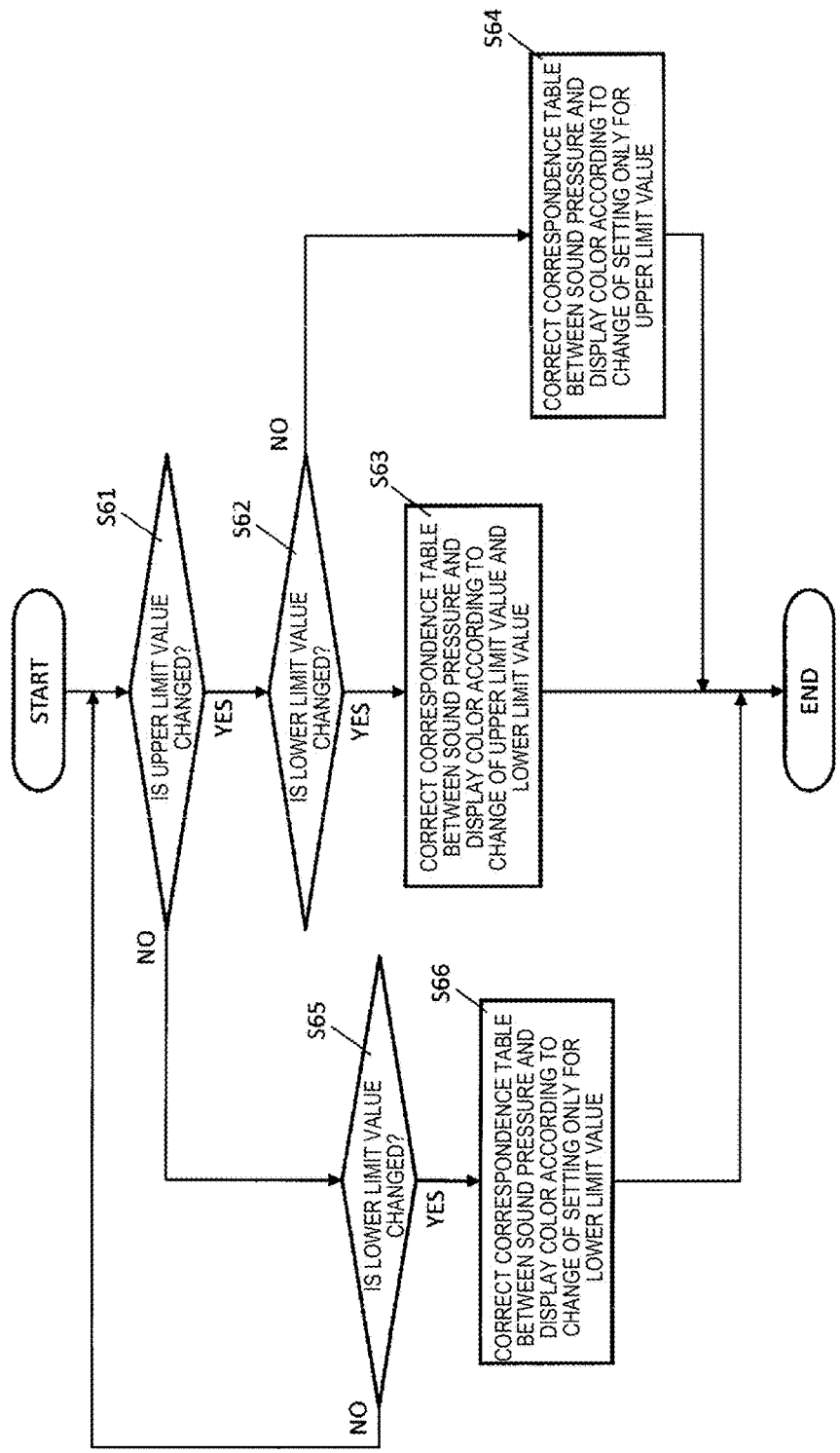
FIG. 21 is a flowchart illustrating an example of an operation procedure of the setting change of the inter-threshold widths in the second exemplary embodiment.

An operation relating to the setting change of the inter-threshold width according to the third analysis method will be described with reference to FIGS. 20 and 21. FIG. 20 is an explanatory diagram illustrating an outline of a display of the captured image accompanied by the setting change of the inter-threshold widths defining the use of the crimson image and the ultramarine image in the second exemplary embodiment. FIG. 21 is a flowchart illustrating an example of an operation procedure of the setting change of inter-threshold widths in the second exemplary embodiment.

As illustrated in FIG. 20, it is assumed that both the inter-threshold widths for respectively defining the use of the sound source visual image (that is, the crimson image) indicating that the sound pressure value is the highest (that is, the upper limit) and the use of the sound source visual image (that is, the ultramarine image) indicating that the sound pressure value is the lowest (that is, the lower limit) are changed. In this case, as illustrated in FIG. 21, in monitoring apparatus 10, threshold adjuster 69b dynamically changes the setting of a correspondence table (not illustrated, correspondence relationship) between the sound source visual images and the thresholds or the inter-threshold widths defining the use of the sound source visual image.

Accordingly, though in the example illustrated in FIG. 20, sound pressure heat map VMP2 superimposed onto the omnidirectional image (that is, the captured image) is configured of only the crimson image, monitoring apparatus 10 generates sound pressure heat map VMP2A using the sound source visual image with kinds of fine colors, through the user's operation, and superimposes sound pressure heat map VMP2A onto the omnidirectional image (that is, the captured image) and displays the result on first monitor MN1. The user's operation refers to, for example, an operation of inputting a threshold or an inter-threshold width displayed on first monitor MN1, with respect to an input screen (not illustrated), or an operation of dragging the inter-threshold width displayed on first monitor MN1, to the display screen, but is not limited thereto.

In FIG. 21, threshold adjuster 69b determines whether or not the inter-threshold width defining the use of the sound source visual image (that is, the crimson image) indicating that the sound pressure value is the highest (that is, the upper limit) is changed through the user's operation using console 32 (S61). In a case where the inter-threshold width defining the use of the sound source visual image (that is, the crimson image) indicating that the sound pressure value is the highest (that is, the upper limit) is changed (YES in S61), threshold adjuster 69b determines whether or not the inter-threshold width defining the use of the sound source visual image (that is, the ultramarine image) indicating that the sound pressure value is the lowest (that is, the lower limit) is changed (S62).

In a case where the inter-threshold width defining the use of the sound source visual image (that is, the ultramarine image) indicating that the sound pressure value is the lowest (that is, the lower limit) is changed (YES in S62), threshold adjuster 69b corrects the correspondence table between the sound source visual images and the thresholds or the inter-threshold widths defining the use of the sound source visual image, according to the change result (S63). For example, threshold adjuster 69b changes the inter-threshold widths such that the widths between the remaining eight thresholds are different from the two inter-threshold widths changed by the user's operation by dynamically changing the inter-threshold widths for the remaining eight thresholds to be equal intervals. In this manner, for example, in a case where plural sound pressure values between the threshold defining the use of the crimson image and the threshold defining the use of the ultramarine image are obtained, monitoring apparatus 10 can display in detail, the distribution around pixels at which plural sound pressure values are concentrated, as the sound pressure heat map through the user's operation of adjusting the inter-threshold width.

In a case where the inter-threshold width defining the use of the sound source visual image (that is, the ultramarine image) indicating that the sound pressure value is the lowest (that is, the lower limit) is not changed (NO in S62), threshold adjuster 69b corrects the correspondence table between the sound source visual images and the thresholds or the inter-threshold widths defining the use of the sound source visual image, according to the change result (S64). For example, threshold adjuster 69b changes the inter-threshold widths such that the widths between the remaining nine thresholds are different from the one inter-threshold width changed by the user's operation by dynamically changing the inter-threshold widths for the remaining nine thresholds to be equal intervals. In this manner, for example, in a case where plural sound pressure values lower than or equal to the threshold defining the use of the crimson image are obtained, monitoring apparatus 10 can display in detail, the distribution around pixels at which plural sound pressure values are concentrated, as the sound pressure heat map through the user's operation of adjusting the inter-threshold width.

Meanwhile, in step S61, in a case where the inter-threshold width defining the use of the sound source visual image (that is, the crimson image) indicating that the sound pressure value is the highest (that is, the upper limit) is not changed (NO in S61), threshold adjuster 69b determines whether or not the inter-threshold width defining the use of the sound source visual image (that is, the ultramarine image) indicating that the sound pressure value is the lowest (that is, the lower limit) is changed (S65). In a case where the inter-threshold width defining the use of the sound source visual image (that is, the ultramarine image) indicating that the sound pressure value is the lowest (that is, the lower limit) is not changed (NO in S65), the process of threshold adjuster 69b returns to step S61.

In a case where the inter-threshold width defining the use of the sound source visual image (that is, the ultramarine image) indicating that the sound pressure value is the lowest (that is, the lower limit) is changed (YES in S65), threshold adjuster 69b corrects the correspondence table between the sound source visual images and the thresholds or the inter-threshold widths defining the use of the sound source visual image, according to the change result (S66). For example, threshold adjuster 69b changes the inter-threshold widths such that the widths between the remaining nine thresholds are different from the one inter-threshold width changed by the user's operation by dynamically changing the inter-threshold widths for the remaining nine thresholds to be equal intervals. In this manner, for example, in a case where plural sound pressure values equal to or greater than the threshold defining the use of the ultramarine image are obtained, monitoring apparatus 10 can display in detail, the distribution around pixels at which plural sound pressure values are concentrated, as the sound pressure heat map through the user's operation of adjusting the inter-threshold width.

As described above, in pilotless flying object detection system 5 of the exemplary embodiment, monitoring apparatus 10 calculates the sound pressure specifying the volume of the sound of monitoring area 8 on a per-predetermined-unit basis of pixels, which form the captured image (omnidirectional image IMG2) of monitoring area 8, by using the audio data collected by microphone array MAk. Monitoring apparatus 10 superimposes the sound source visual image, in which the sound pressure is converted in stages into a different visual image according to comparison between the calculated value of the sound pressure and a plurality of thresholds relating to the volume of the sound, on a per-predetermined-unit basis of pixels which form the captured image and displays the result on first monitor MN1. When any sound source position is designated in the captured image on which the sound source visual image is superimposed, monitoring apparatus 10 calculates a sound pressure for each value obtained by dividing a predetermined unit of pixels which form a rectangular range including the sound source position by a ratio between sizes of the captured image and the rectangular range.

In this manner, monitoring apparatus 10 can accurately display the sound pressure heat map of the rectangular range (cut-out range) designated by the user's operation on first monitor MN1 with a resolution (unit) finer than the display resolution of the sound pressure heat map when simply cutting out the range, and thus can cause the user to accurately ascertain the details of the distribution of the sound sources in the cut-out range designated by the user's operation. In other words, in monitoring apparatus 10, it is possible to present in detail, in stages, the volume of the detected sound at the sound source position in monitoring area 8 of omnidirectional camera CAk, regardless of the magnitude of the volume of the sound at the sound source position, and to assist the user in accurately ascertaining the volume of the sound at the sound source position.

In addition, in pilotless flying object detection system 5 of the exemplary embodiment, monitoring apparatus 10 calculates the sound pressure specifying the volume of the sound of monitoring area 8 on a per-predetermined-unit basis of pixels, which form the captured image (omnidirectional image IMG2) of monitoring area 8, by using the audio data collected by microphone array MAk. Monitoring apparatus 10 dynamically changes the setting of a correspondence relationship between each threshold of a plurality of thresholds defining the volume of the sound in stages and the sound source visual image in which the sound pressure is converted in stages into a different visual image according to comparison between the sound pressure and each threshold, according to the captured image (that is, omnidirectional image) of monitoring area 8. Monitoring apparatus 10 superimposes, onto the captured image, the sound source visual image corresponding to the calculated value of the sound pressure, on the per-predetermined-unit basis of pixels which form the captured image, based on the calculated value of the sound pressure and the changed setting of the correspondence relationship, and displays the result on first monitor MN1.

In this manner, monitoring apparatus 10 can present to a user, a detailed distribution of the sound pressures as the sound pressure heat map for visually indicating the position of the sound source collected in monitoring area 8, according to the captured image captured by omnidirectional camera CAk, and thus can cause the user to accurately ascertain the distribution of the sound source position.

In addition, threshold adjuster 69b of monitoring apparatus 10 changes the inter-threshold width defining the sound source visual image based on the frequency of appearance of the sound pressure on the per-pixel basis using the pixels which form the captured image of monitoring area 8. In this manner, monitoring apparatus 10 generates the sound pressure heat map after increasing kinds of the sound source visual image for pixels corresponding to the calculated value of the sound pressure of which the frequency of appearance is high, and decreasing kinds of the sound source visual image for pixels corresponding to the calculated value of the sound pressure of which the frequency of appearance is low. Therefore, it is possible to present a distribution of the sound pressure with fine and various color tones rather than a simple color tone, and to cause the user to accurately ascertain the distribution of the sound source position.

In addition, threshold adjuster 69b of monitoring apparatus 10 changes all other inter-threshold widths to be equal intervals, except for the inter-threshold width that is changed according to the operation of changing the inter-threshold width defining the use of the sound source visual image (that is, the crimson image) corresponding to the upper limit value of the sound pressure. In this manner, for example, in a case where plural sound pressure values lower than or equal to the threshold defining the use of the crimson image are obtained, monitoring apparatus 10 can display in detail, the distribution around pixels at which plural sound pressure values are concentrated, as the sound pressure heat map through the user's operation of adjusting the inter-threshold width.

In addition, threshold adjuster 69b of monitoring apparatus 10 changes all other inter-threshold widths to be equal intervals, except for the inter-threshold width that is changed according to the operation of changing the inter-threshold width defining the use of the sound source visual image (that is, the ultramarine image) corresponding to the lower limit value of the sound pressure. In this manner, for example, in a case where plural sound pressure values equal to or greater than the threshold defining the use of the ultramarine image are obtained, monitoring apparatus 10 can display in detail, the distribution around pixels at which plural sound pressure values are concentrated, as the sound pressure heat map through the user's operation of adjusting the inter-threshold width.

In addition, threshold adjuster 69b of monitoring apparatus 10 changes all other inter-threshold widths to be equal intervals, except for the inter-threshold widths that are changed according to the operation of changing the inter-threshold width defining the use of the sound source visual image (that is, the crimson image) corresponding to the upper limit value of the sound pressure and the inter-threshold width defining the use of the sound source visual image (that is, the ultramarine image) corresponding to the lower limit value of the sound pressure. In this manner, for example, in a case where plural sound pressure values between the threshold defining the use of the crimson image and the threshold defining the use of the ultramarine image are obtained, monitoring apparatus 10 can display in detail, the distribution around pixels at which plural sound pressure values are concentrated, as the sound pressure heat map through the user's operation of adjusting the inter-threshold width.

History Leading to Third Exemplary Embodiment

Japanese Patent Unexamined Publication No. 2006-168421 described above discloses that a monitoring camera which is capable of changing an imaging direction in arbitrary direction in a monitoring area is provided, and the imaging direction of the monitoring camera is changed if a flying object such as a helicopter or Cessna is detected. In other words, a technique of changing the imaging direction of the monitoring camera in order to perform imaging by focusing on the detected flying object is disclosed.

However, in Japanese Patent Unexamined Publication No. 2006-168421 described above, a technique of displaying the captured image of the periphery including the pilotless flying object detected in the range of the angle of view of the camera device with respect to the imaging area in a wide range is not considered. Therefore, there is a problem that it is difficult to visually present, to a user, the location in the imaging area of the camera device where the pilotless flying object is detected, and what kinds of sound source are present at which locations in the same imaging area.

In a third exemplary embodiment, an example of a monitoring system is described which visually presents to a user, the location in the imaging area of the camera device where the pilotless flying object is detected, and what kinds of sound source are present at which locations in the same imaging area without deterioration of the visibility of the captured image of the camera device.

Third Exemplary Embodiment

In the third exemplary embodiment, since the internal configuration of each device configuring pilotless flying object detection system 5 is the same as the internal configuration of each device configuring pilotless flying object detection system 5 according to the first exemplary embodiment, the same reference numeral is assigned to the same contents and the description of the same contents is not repeated, and different contents will be described.

Figure 22:
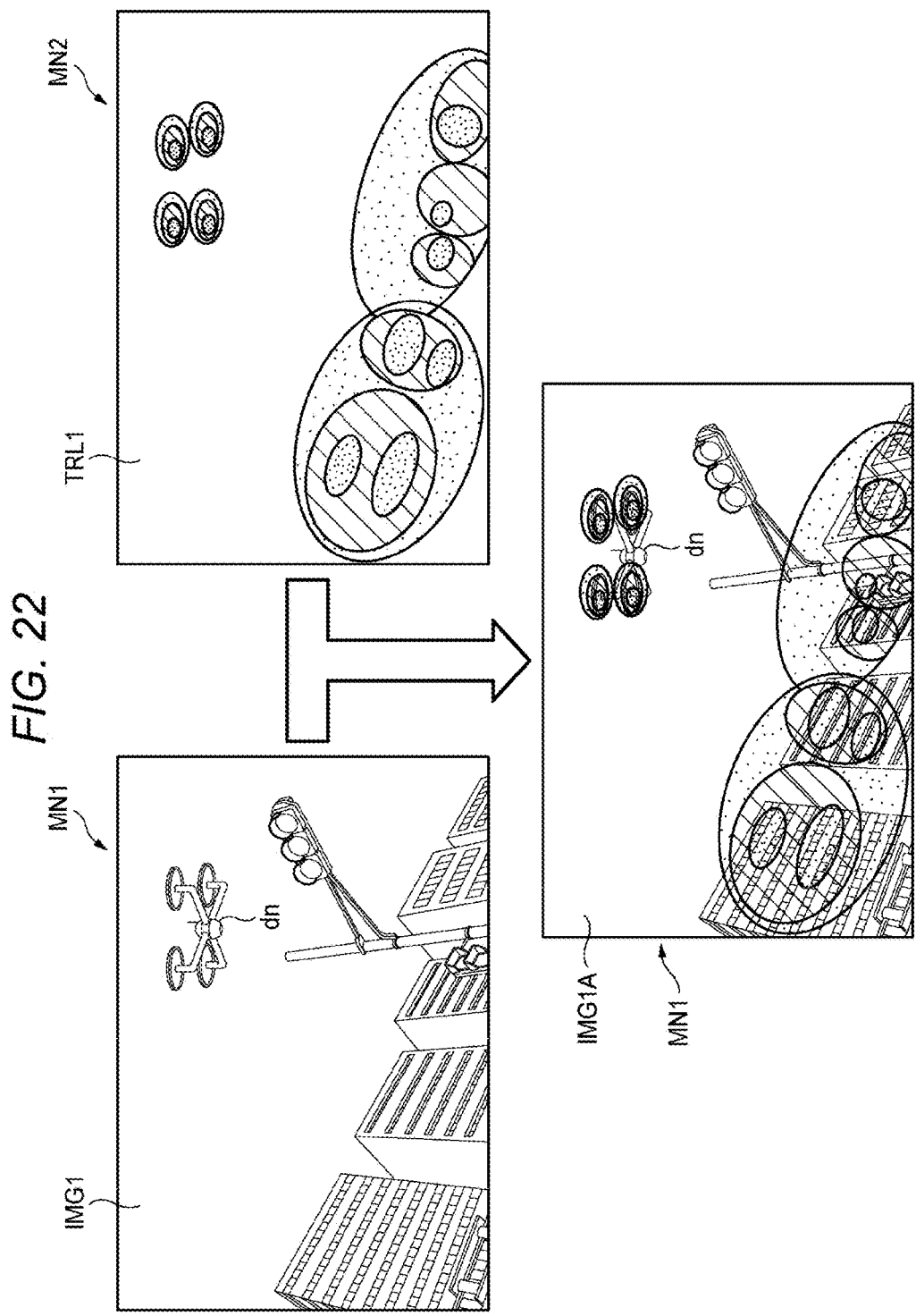
FIG. 22 is an explanatory diagram illustrating an outline of an overlay display of an omnidirectional image and a translucent sound pressure heat map in a third exemplary embodiment.

In the third exemplary embodiment, monitoring apparatus 10 generates a translucent sound pressure heat map as a translucent image (translucent map) of a sound pressure heat map after generating the sound pressure heat map (sound parameter map) described in the first exemplary embodiment, and superimposes the translucent sound pressure heat map onto the omnidirectional image to display the result on first monitor MN1 (refer to FIG. 22). FIG. 22 is an explanatory diagram illustrating an outline of an overlay display of the omnidirectional image and the translucent sound pressure heat map in the third exemplary embodiment.

In the exemplary embodiment, as illustrated in FIG. 22, monitoring apparatus 10 displays omnidirectional image IMG1 captured by omnidirectional camera CAk, on first monitor MN1. Monitoring apparatus 10 generates the sound pressure heat map corresponding to omnidirectional image IMG1 by using the sound source visual image in which the sound pressure value calculated on a per-pixel basis using pixels which form omnidirectional image IMG1 or on a per-predetermined-unit basis of the pixels is converted in stages into a different visual image, and further generates translucent sound pressure heat map TRL1 obtained by converting the sound pressure heat map into the translucent image to display the result on second monitor MN2.

In FIG. 22, monitoring apparatus 10 respectively displays omnidirectional image IMG1 and translucent sound pressure heat map TRL1 on first monitor MN1 and second monitor MN2 which are separate monitors, but may display, for example, omnidirectional image IMG1 on a window and translucent sound pressure heat map TRL1 on a different window, in omnidirectional image IMG1.

Figure 23:
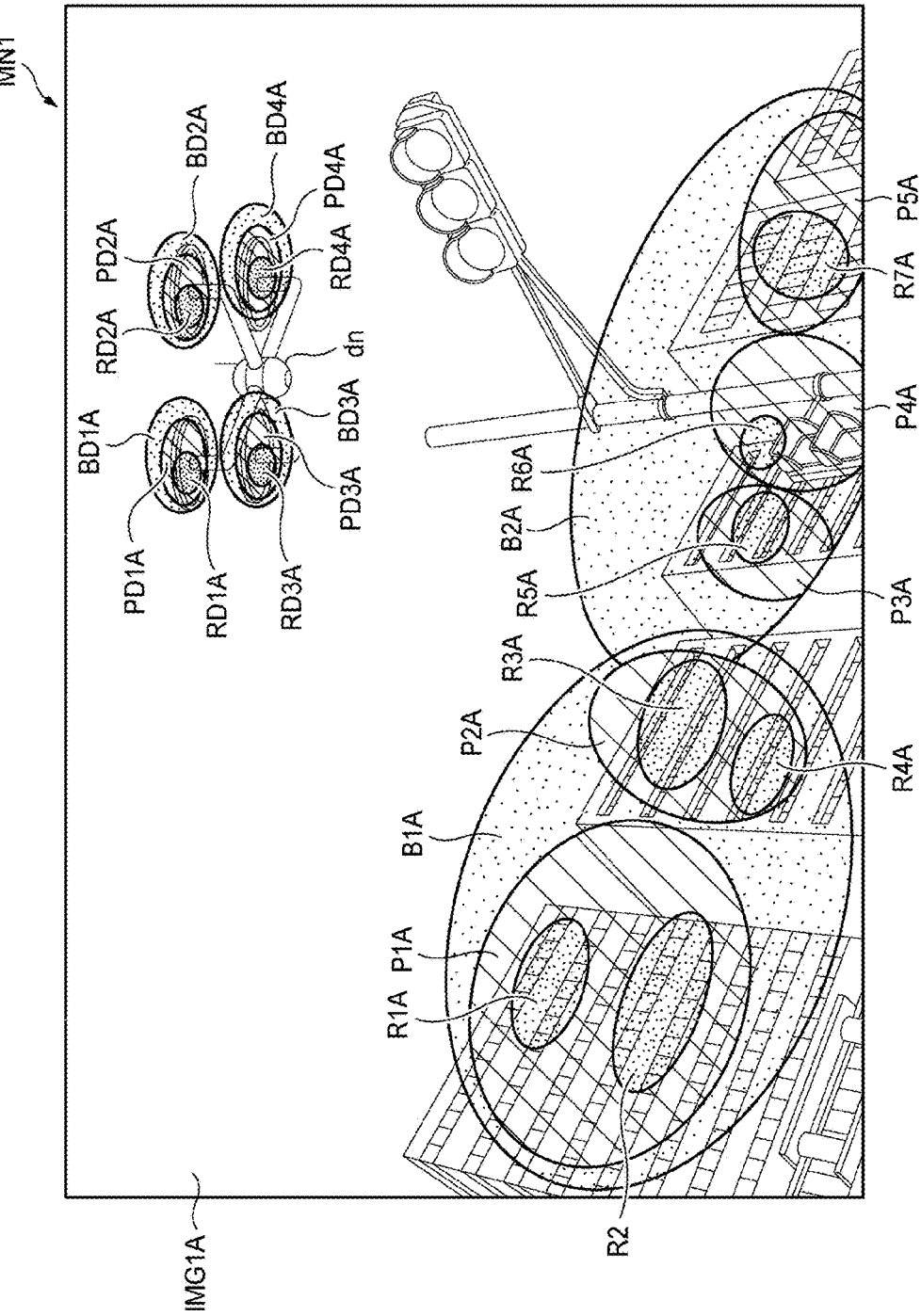
FIG. 23 is a diagram illustrating an example of a display screen of a first monitor on which the omnidirectional image and the translucent sound pressure heat map are overlay-displayed.

Monitoring apparatus 10 displays omnidirectional image IMG1A, which is obtained by superimposing translucent sound pressure heat map TRL1 onto omnidirectional image IMG1, on first monitor MN1 (refer to FIG. 23). FIG. 23 is a diagram illustrating an example of a display screen of first monitor MN1 on which omnidirectional image IMG1 and translucent sound pressure heat map TRL1 are overlay-displayed.

In FIG. 23, in first monitor MN1, pilotless flying object do detected by monitoring apparatus 10 is visible on the upper right side of the paper of FIG. 23 on omnidirectional image IMG1A. In addition, the translucent sound pressure heat map respectively corresponding to the sound sources generated by pilotless flying object dn or in the range of an imaging angle of view of omnidirectional camera CAk is superimposed and displayed.

As described with reference to FIG. 24, in the exemplary embodiment, if the sound pressure value on a per-pixel basis calculated by sound source direction detector 34 is less than or equal to first threshold th1, the area is displayed to be colorless translucent (that is, colorless), if the sound pressure value is greater than first threshold th1 and is less than or equal to second threshold th2, the area is displayed in translucent blue, if the sound pressure value is greater than second threshold th2 and less than or equal to third threshold th3, the area is displayed in translucent pink, and if the sound pressure value is greater than third threshold th3, the area is displayed in translucent red.

In FIG. 23, for example, in the vicinity of the rotary blade or the rotor around the body center of pilotless flying object dn, since the sound pressure value is greater than third threshold th3, the areas are rendered by translucent red areas RD1A, RD2A, RD3A, and RD4A. Similarly, the areas around the translucent red areas are rendered by translucent pink areas PD1A, PD2A, PD3A, and PD4A which indicate that the sound pressure value is the greatest next to the translucent red area. Similarly, the areas around the translucent pink areas are rendered by translucent blue areas BD1A, BD2A, BD3A, and BD4A which indicate that the sound pressure value is the greatest next to the translucent pink area.

In addition, FIG. 23 illustrates that the sound source is also present in office buildings, and pixels at which the sound pressure value on a per-pixel basis calculated by sound source direction detector 34 is greater than third threshold th3 or sets of such pixels are rendered by translucent red areas R1A, R2A, R3A, R4A, R5A, R6A, and R7A. Similarly, the areas around the translucent red areas of the office buildings are rendered by translucent pink areas P1A, P2A, P3A, P4A, and P5A which indicate that the sound pressure value is the greatest next to the translucent red area. Similarly, the areas around the translucent pink areas of the office buildings are rendered by translucent blue areas B1A and B2A which indicate that the sound pressure value is the greatest next to the translucent pink area. Other areas in omnidirectional image IMG1A are rendered by colorless areas since the sound pressure value is less than or equal to first threshold th1.

In this manner, in the exemplary embodiment, since monitoring apparatus 10 superimposes translucent sound pressure heat map TRL1, which is different from that of the first exemplary embodiment, onto omnidirectional image IMG1 to display the result on first monitor MN1, it is possible for the user to visually determine the position of a sound source appearing in omnidirectional image IMG1 and the volume of a sound at the position, and further it is possible not to cause deterioration of visibility of omnidirectional image IMG1.

Next, an operation of pilotless flying object detection system 5 of the exemplary embodiment will be described with reference to FIG. 24.

FIG. 24 is a sequence diagram illustrating an example of an operation procedure of the overlay display of omnidirectional image IMG1 and translucent sound pressure heat map TRL1 in the third exemplary embodiment. When power is input to the devices (for example, first monitor MN1, monitoring apparatus 10, omnidirectional camera CAk, and microphone array MAk) of pilotless flying object detection system 5, pilotless flying object detection system 5 starts operating. In addition, in the description of FIG. 24, the masking area described in the first exemplary embodiment may be used or may not be used. In FIG. 24, a case in which the masking area is used is described as an example. In a case where the masking area is used, it is assumed that information indicating the masking area is registered in memory 38.

Monitoring apparatus 10 performs an image transmission request in relation to omnidirectional camera CAk (S71). Omnidirectional camera CAk starts the imaging process corresponding to the input of power in accordance with the image transmission request. In addition, monitoring apparatus 10 performs an audio transmission request in relation to microphone array MAk (S72). Microphone array MA starts the sound collection process corresponding to the input of power in accordance with the audio transmission request.

Once the initialization operations are completed, omnidirectional camera CAk transmits the data of the omnidirectional image (for example, a still image or a video) which is obtained through imaging to monitoring apparatus 10 via network NW (S73). In order for the brief description, in FIG. 24, it is described that the omnidirectional image data is transmitted from omnidirectional camera CAk; however, two-dimensional panorama image data may be transmitted. Monitoring apparatus 10 converts the omnidirectional image data which is transmitted from omnidirectional camera CAk into display data such as NTSC, outputs the display data to first monitor MN1, and instructs first monitor MN1 to display the omnidirectional image data (S74). When the display data transmitted from monitoring apparatus 10 is input, first monitor MN1 displays on the screen, the data (refer to the upper left side of the paper of FIG. 22) of omnidirectional image IMG1 by omnidirectional camera CAk.

Microphone array MAk encodes the audio data of monitoring area 8 which is obtained through sound collection and transmits the encoded audio data to monitoring apparatus 10 via network NW (S75). In monitoring apparatus 10, sound source direction detector 34 calculates the sound pressure as the sound parameter, on a per-pixel basis using the individual pixels which form the omnidirectional image data of monitoring area 8, based on the omnidirectional image data which is captured by omnidirectional camera CAk and the audio data which is collected by microphone array MAk, and further estimates the sound source position within monitoring area 8 (S76). When monitoring apparatus 10 detects pilotless flying object dn, the estimated sound source position is used as the reference position of directivity setting area BF1 which is necessary for the initial setting of the directivity setting direction.

In addition, in monitoring apparatus 10, output controller 35 generates a sound pressure map in which a calculated value of the sound pressure is allocated to the position of a pixel on a per-pixel basis using the pixels which form the omnidirectional image data, by using the sound pressure values on a per-pixel basis using the pixels which form the omnidirectional image data which are calculated by sound source direction detector 34. Furthermore, output controller 35 generates a translucent sound pressure heat map such as that illustrated in the upper right side of the paper of FIG. 22 by performing a color transformation process on the sound pressure values on a per-pixel basis using the pixels of the generated sound pressure map so as to obtain the visual image (for example, colored image) such that it is easy for the user to perform visual determination (S77). The method of generating the translucent sound pressure heat map is a procedure in which, for example, output controller 35 primarily generates a sound pressure heat map (refer to step S7 of FIG. 9), secondarily performs a process of causing the sound pressure heat map to be translucent, and thereby generates the translucent sound pressure heat map.

Further, in monitoring apparatus 10, when signal processor 33 forms sequential directionality for the area other than the masking area set by masking area setter 69a, by using the audio data transmitted from microphone array MAk in step S75, detection determination of pilotless flying object dn for each directivity setting direction in which the directionality is formed is performed (S78). The detection determination process of pilotless flying object dn is described with reference to FIGS. 10 and 11, and thus will not be repeated.

In a case in which pilotless flying object dn is detected as a result of the detection determination process, output controller 35 in monitoring apparatus 10 instructs to superimpose the translucent sound pressure heat map generated in step S77, and the identification mark (not illustrated), which represents pilotless flying object dn which is present in the directivity setting direction detected in step S78, onto omnidirectional image IMG1 which is displayed on the screen of first monitor MN1 and to display the result (S79).

First monitor MN1 combines (superimposes) the translucent sound pressure heat map on omnidirectional image IMG1 according to the instruction from monitoring apparatus 10 and displays the result, and combines (superimposes) the identification mark (not illustrated) representing pilotless flying object dn on omnidirectional image IMG1 and displays the result (S80). Subsequently, the process of pilotless flying object detection system 5 returns to step S73, and processes of steps S73 to S80 are repeated until a predetermined event such as the power being operated to turn off, for example, is detected.

As described above, in pilotless flying object detection system 5 of the exemplary embodiment, monitoring apparatus 10 calculates the sound pressure specifying the volume of the sound of monitoring area 8 on a per-predetermined-unit basis of pixels, which form the captured image (omnidirectional image IMG1) of monitoring area 8, by using the audio data collected by microphone array MAk. Monitoring apparatus 10 generates a translucent sound pressure heat map in which the sound source visual image, in which the sound pressure is converted into a visual image according to comparison between the calculated value of the sound pressure and a threshold relating to the volume of a sound, on a per-predetermined-unit basis of pixels, is linked to correspond to the volume of the omnidirectional image of monitoring area 8. Monitoring apparatus 10 superimposes the translucent sound pressure heat map onto the captured image of monitoring area 8 and displays the result on first monitor MN1.

In this manner, in pilotless flying object detection system 5, it is difficult to visually present, to a user, the location in monitoring area 8 of omnidirectional camera CAk where the pilotless flying object is detected, and what kinds of sound source are present at which locations in monitoring area 8 without deterioration of the visibility of the captured image of omnidirectional camera CAk.

In addition, a plurality of thresholds relating to the volume of a sound are provided, and thus monitoring apparatus 10 generates a translucent sound pressure heat map including plural kinds of sound source visual images, by using sound source visual image in which the sound pressure is converted in stages into a different visual image, according to comparison between the sound pressure and the plurality of thresholds, on a per-predetermined-unit basis of pixels. In this manner, in monitoring apparatus 10, it is possible for the user to further expressly determine the presence of the sound pressure having plural kinds of levels prescribed by the plurality of thresholds, by the sound source visual image among the omnidirectional image captured by omnidirectional camera CAk.

In the exemplary embodiment, monitoring apparatus 10 sets the masking area described in the first exemplary embodiment, and detects the pilotless flying object in an area other than the masking area by using the audio data collected by microphone array MAk and information indicating the masking area. In a case where the pilotless flying object is detected in an area other than the masking area, monitoring apparatus 10 displays the sound source visual image, which indicates the volume of the sound generated by the pilotless flying object, on first monitor MN1 in a translucent manner in the vicinity of the pilotless flying object (in other words, sound source position of the pilotless flying object) in the omnidirectional image. In this manner, since monitoring apparatus 10 can exclude the masking area from the detection target of the pilotless flying object, it is possible to suppress deterioration of the detection precision of the masking area and to improve the speed of the detection process for the pilotless flying object. Monitoring apparatus 10 displays the level of the volume of the sound output from the pilotless flying object, at the sound source position of pilotless flying object do detected in an area other than the masking area, by using the translucent image of the sound source visual image, and therefore, it is possible not to cause deterioration of visibility of the captured image around the sound source position as well as the volume of the sound.

In the exemplary embodiment, monitoring apparatus 10 changes the setting of a correspondence relationship between each threshold of a plurality of thresholds defining the volume of a sound in stages and plural kinds of sound source visual images, according to the captured image of the imaging area. Monitoring apparatus 10 generates a translucent sound pressure heat map in which the sound source visual image on a per-predetermined-unit basis of pixels, is linked to correspond to the size of the captured image of the imaging area, based on the calculated value of the sound pressure and the changed correspondence relationship. In this manner, monitoring apparatus 10 can change the correspondence relationship between the calculated value of the sound pressure obtained on a per-pixel basis using pixels which form the captured image or on a per-predetermined-unit basis of the pixels, and the sound source visual image corresponding to the calculated value of the sound pressure, according to the contents of the omnidirectional image (the captured image) captured by omnidirectional camera CAk. Accordingly, for example, at a location where a specific calculated value of the sound pressure is concentrated, monitoring apparatus 10 uses not a sound source visual image formed of a single color, but a sound source visual image formed of plural kinds of colors, for the sound source visual image around the location so as to cause the user to clearly ascertain in detail, the distribution of the volume of the sound of the sound source appearing in the captured image in detail.

SUMMARY OF DISCLOSURE

Hereinafter, the summary of the disclosure will be described.

A monitoring system of the disclosure includes a camera which images an imaging area; a microphone array which collects audio of the imaging area; a monitor which displays a captured image of the imaging area which is captured by the camera; a masking area setter that sets a masking area to be excluded from detection of a pilotless flying object which appears in the captured image of the imaging area, based on the audio collected by the microphone array; a detector that detects the pilotless flying object based on the audio collected by the microphone array and the masking area set by the masking area setter; and a signal processor that superimpose a sound source visual image, which indicates the volume of a sound at a sound source position, at the sound source position of the pilotless flying object in the captured image and displays the result on the monitor in a case where the pilotless flying object is detected in an area other than the masking area.

The monitoring system according to the disclosure may further include a sound parameter deriving unit that derives a sound parameter, which specifies the volume of a sound of the imaging area, on a per-predetermined-unit basis of pixels which form the captured image of the imaging area, based on the audio collected by the microphone array, in which the masking area setter may superimpose and display a sound source area in which the sound parameter derived by the sound parameter deriving unit is greater than or equal to a masking area threshold relating to the volume of a sound, on the monitor, and set the sound source area displayed on the monitor as the masking area through a user's confirming operation.

In the monitoring system according to the disclosure, through a user's adding operation for further adding a sound source area displayed on the monitor, the masking area setter may set the sound source area after the user's adding operation as the masking area.

In the monitoring system according to the disclosure, through a user's deleting operation for deleting at least a part of a sound source area displayed on the monitor, the masking area setter may set the sound source area after the user's deleting operation as the masking area.

In the monitoring system according to the disclosure, the signal processor superimposes the sound source visual image in which the sound parameter is converted in stages into a different visual image according to comparison between the derived sound parameter and a plurality of thresholds relating to the volume of a sound, on a per-predetermined-unit basis of pixels which form the captured image of the imaging area and displays the result on the monitor.

A monitoring system according to the disclosure may include a camera which images an imaging area; a microphone array which collects audio of the imaging area; a monitor which displays a captured image of the imaging area which is captured by the camera; a sound parameter deriving unit that derives a sound parameter, which specifies the volume of a sound of the imaging area, on a per-predetermined-unit basis of pixels which form the captured image of the imaging area, based on the audio collected by the microphone array; and a signal processor that generates a sound parameter map as a translucent map in which a sound source visual image, in which the sound parameter is converted into a visual image according to comparison between the sound parameter derived by the sound parameter deriving unit and a threshold relating to the volume of a sound, on a per-predetermined-unit basis of pixels, is linked to correspond to the size of the captured image of the imaging area, in which the signal processor may superimpose the translucent map onto the captured image of the imaging area and display the result on the monitor.

In the monitoring system according to the disclosure, a plurality of thresholds relating to the volume of the sound may be provided, and the signal processor may generate the sound parameter map as a translucent map including plural kinds of sound source visual images, by using the sound source visual image in which the sound parameter is converted in stages into a different visual image, according to comparison between the sound parameter and the plurality of thresholds, on a per-predetermined-unit basis of pixels.

The monitoring system according to the disclosure may further include a masking area setter that sets a masking area to be excluded from detection of a pilotless flying object which appears in the captured image of the imaging area, based on the audio collected by the microphone array; and a detector that detects the pilotless flying object based on the audio collected by the microphone array and the masking area set by the masking area setter, in which, in a case where the pilotless flying object is detected in an area other than the masking area, the signal processor may display the sound source visual image, which indicates the volume of the sound of the pilotless flying object, on the monitor in a translucent manner in the vicinity of the pilotless flying object in the captured image of the imaging area.

The monitoring system according to the disclosure may further include a threshold adjuster that changes a setting of a correspondence relationship between each threshold of a plurality of thresholds defining the volume of a sound in stages and the plural kinds of sound source visual images according to the captured image of the imaging area, and the signal processor may generate a sound parameter map as a translucent map in which the sound source visual image on a per-predetermined-unit basis of pixels is linked to correspond to the size of the captured image of the imaging area based on the sound parameter derived by the sound parameter deriving unit and the correspondence relationship changed by the threshold adjuster.

A monitoring system according to the discloser may include: a camera which images an imaging area; a microphone array which collects audio of the imaging area; a monitor which displays a captured image of the imaging area which is captured by the camera; a sound parameter deriving unit that derives a sound parameter, which specifies the volume of a sound of the imaging area, on a per-predetermined-unit basis of pixels which form the captured image of the imaging area, based on the audio collected by the microphone array; and a signal processor that superimposes a sound source visual image in which the sound parameter is converted in stages into a different visual image according to comparison between the sound parameter derived by the sound parameter deriving unit and a plurality of thresholds relating to the volume of a sound, on a per-predetermined-unit basis of pixels which form the captured image of the imaging area and displays the result on the monitor, in which, when any sound source position is designated in the captured image of the imaging area on which the sound source visual image is superimposed, the sound parameter deriving unit may derive the sound parameter for each value obtained by dividing a predetermined unit of pixels which form a rectangular range including the sound source position by a ratio between sizes of the captured image of the imaging area and the rectangular range.

A monitoring system according to the disclosure may include: a camera which images an imaging area; a microphone array which collects audio of the imaging area; a monitor which displays a captured image of the imaging area which is captured by the camera; a sound parameter deriving unit that derives a sound parameter, which specifies the volume of a sound of the imaging area, on a per-predetermined-unit basis of pixels which form the captured image of the imaging area, based on the audio collected by the microphone array; a threshold adjuster that changes a setting of a correspondence relationship between each threshold of a plurality of thresholds defining the volume of a sound in stages and a sound source visual image in which the sound parameter is converted in stages into a different visual image according to comparison between the sound parameter and each threshold, according to the captured image of the imaging area; and a signal processor that superimposes the sound source visual image corresponding to the sound parameter onto the captured image of the imaging area, on a per-predetermined-unit basis of pixels which form the captured image of the imaging area, based on the sound parameter derived by the sound parameter deriving unit and the correspondence relationship changed by the threshold adjuster and displays the result.

In the monitoring system according to the disclosure, the threshold adjuster may change widths of the thresholds defining the sound source visual image, based on the frequency of appearance of the sound parameter on a per-predetermined-unit basis of pixels which form the captured image.

In the monitoring system according to the disclosure, the threshold adjuster may equally change all other inter-threshold widths except for the inter-threshold width that is changed, according to an operation of changing the inter-threshold width defining the use of the sound source visual image corresponding to the upper limit value of the sound parameter.

In the monitoring system according to the disclosure, the threshold adjuster may equally change all other inter-threshold widths except for the inter-threshold width that is changed, according to an operation of changing the inter-threshold width defining the use of the sound source visual image corresponding to the lower limit value of the sound parameter.

In the monitoring system according to the disclosure, the threshold adjuster may equally change all other inter-threshold widths except for the width of the upper end thresholds and the width of the lower end thresholds that are changed, according to an operation of changing the inter-threshold width defining the use of the sound source visual image corresponding to the upper limit value of the sound parameter and the inter-threshold width defining the use of the sound source visual image corresponding to the lower limit value of the sound parameter.

A monitoring method according to the disclosure, in a monitoring system provided with a camera and a microphone array, may include imaging an imaging area by the camera; collecting audio of the imaging area by the microphone array; displaying a captured image of the imaging area which is captured by the camera, on a monitor; setting a masking area to be excluded from detection of a pilotless flying object which appears in the captured image of the imaging area, based on the audio collected by the microphone array; detecting the pilotless flying object based on the audio collected by the microphone array and the set masking area; and superimposing a sound source visual image, which indicates the volume of a sound at a sound source position, at the sound source position of the pilotless flying object in the captured image and displaying the result on the monitor in a case where the pilotless flying object is detected in an area other than the masking area.

The monitoring method according to the disclosure, in a monitoring system provided with a camera and a microphone array, may include imaging an imaging area by the camera; collecting audio of the imaging area by the microphone array; displaying a captured image of the imaging area which is captured by the camera, on a monitor; deriving a sound parameter, which specifies the volume of a sound of the imaging area, on a per-predetermined-unit basis of pixels which form the captured image of the imaging area, based on the audio collected by the microphone array; generating a sound parameter map as a translucent map in which a sound source visual image, in which the sound parameter is converted into a visual image according to comparison between the derived sound parameter and a threshold relating to the volume of a sound, on a per-predetermined-unit basis of pixels, is linked to correspond to the size of the captured image of the imaging area; and superimposing the generated translucent map onto the captured image of the imaging area and displaying the result on the monitor.

A monitoring method according to the disclosure, in a monitoring system provided with a camera and a microphone array, may include imaging an imaging area by the camera; collecting audio of the imaging area by the microphone array; displaying a captured image of the imaging area which is captured by the camera, on a monitor; deriving a sound parameter, which specifies the volume of a sound of the imaging area, on a per-predetermined-unit basis of pixels which form the captured image of the imaging area, based on the audio collected by the microphone array; superimposing a sound source visual image in which the sound parameter is converted in stages into a different visual image according to comparison between the sound parameter and a plurality of thresholds, on a per-predetermined-unit basis of pixels which form the captured image of the imaging area and displaying the result on the monitor; and further deriving, when any sound source position is designated in the captured image of the imaging area on which the sound source visual image is superimposed, the sound parameter for each value obtained by dividing a predetermined unit of pixels which form a rectangular range including the sound source position by a ratio between sizes of the captured image of the imaging area and the rectangular range.

A monitoring method according to the disclosure, in a monitoring system provided with a camera and a microphone array, may include imaging an imaging area by the camera; collecting audio of the imaging area by the microphone array; displaying a captured image of the imaging area which is captured by the camera, on a monitor; deriving a sound parameter, which specifies the volume of a sound of the imaging area, on a per-predetermined-unit basis of pixels which form the captured image of the imaging area, based on the audio collected by the microphone array; changing a setting of a correspondence relationship between each threshold of a plurality of thresholds defining the volume of a sound in stages and a sound source visual image in which the sound parameter is converted in stages into a different visual image according to comparison between the sound parameter and each threshold, according to the captured image of the imaging area; and superimposing the sound source visual image corresponding to the sound parameter onto the captured image of the imaging area, on a per-predetermined-unit basis of pixels which form the captured image of the imaging area, based on the derived sound parameter and the changed correspondence relationship and displaying the result on the monitor.

Hereunto description is given of an exemplary embodiment with reference to the drawings, and it goes without saying that the disclosure is not limited to the examples given. It is clear to a person skilled in the art that various modifications and corrections may be made within the scope disclosed in the claims. Naturally, such modifications and corrections are understood to fall within the technical scope of the disclosure.

What is claimed is:
1. A monitoring system comprising:
a camera, which, in operation, captures images of an imaging area;
a microphone array, which, in operation, collects audio from the imaging area;
a monitor, which, in operation, displays a captured image of the imaging area which is captured by the camera;

a processor; and a memory including instructions that, when executed by the processor, cause the processor to perform operations including:

using the audio collected by the microphone array to set a masking area to be excluded from detection of a pilotless flying object which appears in the captured image of the imaging area;

detecting the pilotless flying object based on the audio collected by the microphone array from outside the masking area set by the masking area setter; and superimposing a sound source visual image on the captured image and around the pilotless flying object detected in the captured image, the sound source visual image indicating the volume of a sound at a sound source position, and when the pilotless flying object is detected in an area other than the masking area, displaying the captured image, the pilotless flying object detected in the captured image and the sound source visual image on the monitor.

2. The monitoring system of claim 1, the operations further including:

deriving a sound parameter, which specifies the volume of the audio from the imaging area, on a per-predetermined-unit basis of pixels which form the captured image of the imaging area, based on the audio collected by the microphone array, superimposing and displaying, on the monitor, a sound source area in which the derived sound parameter is greater than or equal to a masking area threshold volume of audio, and setting the sound source area displayed on the monitor as the masking area through a user's confirming operation.

3. The monitoring system of claim 2, the operations further including:

setting the masking area as a sound source area designated by a user's adding operation of adding a sound source area to the captured image displayed on the monitor.

4. The monitoring system of claim 2, the operations further including:

deleting at least a part of a sound source area displayed on the monitor through a user's deleting operation; and setting the sound source area after the user's deleting operation as the masking area.

5. The monitoring system of claim 2, the operations further including:

superimposing the sound source visual image in which the sound parameter is converted in stages into a different visual image according to comparison between the derived sound parameter and a plurality of thresholds relating to the volume of audio, on a per-predetermined-unit basis of pixels which form the captured image of the imaging area; and displaying, on the monitor, a result of the superimposing the sound source visual image in which the sound parameter is converted in stages into a different visual image according to comparison between the derived sound parameter and a plurality of thresholds relating to the volume of audio, on a per-predetermined-unit basis of pixels which form the captured image of the imaging area.

6. A monitoring method in a monitoring system including a camera and a microphone array, the method comprising:

capturing images of an imaging area using the camera;

collecting audio from the imaging area using the microphone array;

displaying, on a monitor, a captured image of the imaging area which is captured by the camera;

setting a masking area to be excluded from detection of a pilotless flying object which appears in the captured image of the imaging area, the masking area being set using the audio collected by the microphone array;

detecting the pilotless flying object based on the audio collected by the microphone array from outside the set masking area; and superimposing a sound source visual image on the captured image and around the pilotless flying object detected in the captured image, the sound source visual image indicating the volume of a sound at a sound source position, and when the pilotless flying object is detected in an area other than the masking area, displaying the captured image, the pilotless flying object detected in the captured image and the sound source visual image on a monitor.

7. The monitoring method of claim 6 further comprising:

deriving a sound parameter, which specifies the volume of the audio from the imaging area, on a per-predetermined-unit basis of pixels which form the captured image of the imaging area, based on the audio collected by the microphone array, superimposing and displaying, on the monitor, a sound source area in which the derived sound parameter is greater than or equal to a masking area threshold volume of audio, and setting the sound source area displayed on the monitor as the masking area through a user's confirming operation.

8. The monitoring method of claim 7 further comprising:

setting the masking area as a sound source area designated by a user's adding operation of adding a sound source area to the captured image displayed on the monitor.

9. The monitoring method of claim 7 further comprising:

deleting at least a part of a sound source area displayed on the monitor through a user's deleting operation; and setting the sound source area after the user's deleting operation as the masking area.

10. The monitoring method of claim 7 further comprising:

superimposing the sound source visual image in which the sound parameter is converted in stages into a different visual image according to comparison between the derived sound parameter and a plurality of thresholds relating to the volume of audio, on a per-predetermined-unit basis of pixels which form the captured image of the imaging area; and displaying, on the monitor, a result of the superimposing the sound source visual image in which the sound parameter is converted in stages into a different visual image according to comparison between the derived sound parameter and a plurality of thresholds relating to the volume of audio, on a per-predetermined-unit basis of pixels which form the captured image of the imaging area.

* * * * *